US012674409B2

(12) United States Patent
Blumreiter et al.

(10) Patent No.: US 12,674,409 B2
(45) Date of Patent: Jul. 7, 2026

(54) SYSTEMS AND METHODS FOR COMBUSTING UNCONVENTIONAL FUEL CHEMISTRIES IN A DIESEL ENGINE ARCHITECTURE

(71) Applicant: Climate Energy Investments, LLC, Los Altos, CA (US)

(72) Inventors: Julie Blumreiter, Batavia, IL (US); Bernard Johnson, Chicago, IL (US)

(73) Assignee: Climate Energy Investments, LLC, Los Altos, CA (US)

( * ) Notice: Subject to any disclaimer, the term of this patent is extended or adjusted under 35 U.S.C. 154(b) by 9 days.

(21) Appl. No.: 18/594,841

(22) Filed: Mar. 4, 2024

(65) Prior Publication Data

US 2025/0027440 A1 Jan. 23, 2025

Related U.S. Application Data

(63) Continuation of application No. 18/094,462, filed on Jan. 9, 2023, now Pat. No. 11,952,936, which is a (Continued)

(51) Int. Cl.
*F02B 9/04* (2006.01)
*F02B 3/08* (2006.01)
(Continued)

(52) U.S. Cl.
CPC .................. *F02B 9/04* (2013.01); *F02B 3/08* (2013.01); *F02D 13/0215* (2013.01);
(Continued)

(58) Field of Classification Search
CPC ........ F02B 9/04; F02B 3/08; F02B 2201/064; F02B 2720/153; F02B 23/0657;
(Continued)

(56) References Cited

U.S. PATENT DOCUMENTS 3,794,007 A 2/1974 Hardenberg et al.
4,416,229 A 11/1983 Wood
(Continued)

FOREIGN PATENT DOCUMENTS

EP 0116197 A2 8/1984
FR 2960261 A1 11/2011
(Continued)

OTHER PUBLICATIONS

Bailey, B. et al. (1997) "Diethyl Ether (DEE) as a Renewable Diesel Fuel" Journal of Fuels and Lubricants, 106(4):1578-1584.
(Continued)

*Primary Examiner* — Joseph J Dallo
(74) *Attorney, Agent, or Firm* — COOLEY LLP

(57) ABSTRACT

Embodiments described herein relate to systems and methods of operating internal combustion (IC) engines by combusting various fuel chemistries therein. Specifically, engines described herein can operate a wide range of fuel chemistries with varying molecular formulas. The chemical compositions of the fuels described herein make them more difficult to ignite than long chain hydrocarbons (i.e., fuels that include 6 or more carbon atoms in a molecule). In some embodiments, engines described herein can combust fuels that have the chemical properties of alcohols. In some embodiments, engines described herein can combust fuels that include hydroxide groups. Examples of such fuels include methanol and/or ethanol. In some embodiments, engines described herein can combust natural gas. These fuel chemistries are difficult to ignite, particularly at low temperatures and during initial engine startup. Systems and methods described herein address these ignition difficulties, particularly in diesel engine architectures.

30 Claims, 6 Drawing Sheets

Related U.S. Application Data continuation of application No. 18/088,318, filed on Dec. 23, 2022, now abandoned, which is a continuation of application No. 17/092,474, filed on Nov. 9, 2020, now abandoned, which is a continuation of application No. PCT/US2020/032961, filed on May 14, 2020.

(60) Provisional application No. 62/848,087, filed on May 15, 2019.

(51) Int. Cl.

| | |
|---|---|
| ***F02D 13/02*** | (2006.01) |
| ***F02D 19/08*** | (2006.01) |
| ***F02D 41/00*** | (2006.01) |
| ***F02D 41/06*** | (2006.01) |
| ***F02D 41/30*** | (2006.01) |
| ***F02D 41/40*** | (2006.01) |
| ***F02M 26/13*** | (2016.01) |
| ***F02P 5/145*** | (2006.01) |
| ***F02P 19/04*** | (2006.01) |
| ***F02P 21/00*** | (2006.01) |
| ***F02P 23/00*** | (2006.01) |

(52) U.S. Cl.
CPC ......... *F02D 19/084* (2013.01); *F02D 41/009* (2013.01); *F02D 41/064* (2013.01); *F02D 41/3041* (2013.01); *F02D 41/401* (2013.01); *F02M 26/13* (2016.02); *F02P 5/145* (2013.01); *F02P 19/04* (2013.01); *F02P 21/00* (2013.01); *F02P 23/00* (2013.01); *F02B 2201/064* (2013.01); *F02B 2720/153* (2013.01)

(58) Field of Classification Search
CPC .. F02D 13/0215; F02D 19/084; F02D 41/009; F02D 41/064; F02D 41/3041; F02D 41/401; F02D 13/0219; F02D 19/0649; F02D 41/3827; F02D 2041/001; F02D 2200/0414; F02D 2200/0602; F02D 41/0007; F02M 26/13; F02P 5/145; F02P 19/04; F02P 21/00; F02P 23/00; Y02T 10/12; Y02T 10/40
See application file for complete search history.

(56) References Cited

U.S. PATENT DOCUMENTS

| | | | | |
|---|---|---|---|---|
| 4,444,166 | A | 4/1984 | Kovacs et al. | |
| 4,678,479 | A | 7/1987 | Holmes et al. | |
| 4,788,369 | A | 11/1988 | Marsh et al. | |
| 5,095,872 | A | 3/1992 | Kawamura | |
| 5,136,994 | A | 8/1992 | Gale | |
| 5,417,189 | A | 5/1995 | Regueiro | |
| 5,692,468 | A | 12/1997 | Haman et al. | |
| 5,768,887 | A | 6/1998 | Nakamura et al. | |
| 6,158,413 | A | 12/2000 | Kimura et al. | |
| 6,267,097 | B1 | 7/2001 | Urushihara et al. | |
| 6,340,003 | B1 | 1/2002 | Schoubye et al. | |
| 6,394,051 | B1 * | 5/2002 | Filipe | F02D 13/0219 60/285 |
| 6,401,688 | B2 | 6/2002 | Teraji et al. | |
| 6,435,159 | B1 | 8/2002 | Craft et al. | |
| 6,530,209 | B2 | 3/2003 | Kuwabara et al. | |
| 6,557,520 | B2 | 5/2003 | Roberts, Jr. | |
| 6,612,294 | B2 | 9/2003 | Hiraya et al. | |
| 6,814,059 | B2 | 11/2004 | Ito et al. | |
| 6,858,048 | B1 | 2/2005 | Jimeson et al. | |
| 6,966,295 | B2 | 11/2005 | Yamaoka et al. | |
| 6,971,365 | B1 | 12/2005 | Najt et al. | |
| 7,017,561 | B1 | 3/2006 | Liu et al. | |
| 7,047,933 | B2 | 5/2006 | Gray, Jr. | |
| 7,059,281 | B2 | 6/2006 | Kuo et al. | |
| 7,213,564 | B2 | 5/2007 | Hill et al. | |
| 7,363,911 | B2 | 4/2008 | Brehob | |
| 7,370,626 | B2 | 5/2008 | Schubert | |
| 7,387,104 | B2 | 6/2008 | Sulkowski | |
| 7,461,628 | B2 | 12/2008 | Blumberg et al. | |
| 7,559,961 | B2 | 7/2009 | Jimeson et al. | |
| 7,621,262 | B2 | 11/2009 | Zubeck | |
| 7,743,754 | B2 | 6/2010 | Cheiky | |
| 7,770,545 | B2 | 8/2010 | Morgenstern | |
| 7,909,019 | B2 | 3/2011 | Stein | |
| 7,971,567 | B2 | 7/2011 | Zubeck et al. | |
| 8,006,672 | B2 | 8/2011 | Krenus et al. | |
| 8,028,678 | B2 | 10/2011 | Stein | |
| 8,141,356 | B2 | 3/2012 | Leone et al. | |
| 8,235,024 | B2 | 8/2012 | Zubeck et al. | |
| 8,245,690 | B2 | 8/2012 | Stein | |
| 8,327,823 | B2 | 12/2012 | Courtoy et al. | |
| 8,327,831 | B2 | 12/2012 | Sturman | |
| 8,352,166 | B2 | 1/2013 | Surnilla et al. | |
| 8,353,270 | B2 | 1/2013 | Ulrey et al. | |
| 8,359,168 | B2 | 1/2013 | Lepsch et al. | |
| 8,365,701 | B1 | 2/2013 | Sturman | |
| 8,495,974 | B2 | 7/2013 | Agosta | |
| 8,495,983 | B2 | 7/2013 | Zubeck et al. | |
| 8,555,852 | B2 | 10/2013 | Munshi et al. | |
| 8,590,505 | B2 | 11/2013 | Simmons et al. | |
| 8,590,506 | B2 | 11/2013 | Lee et al. | |
| 8,646,437 | B2 | 2/2014 | Sales | |
| 8,689,767 | B1 | 4/2014 | Dec et al. | |
| 8,783,227 | B2 | 7/2014 | Yamakawa et al. | |
| 8,820,269 | B2 | 9/2014 | Duwig et al. | |
| 8,838,364 | B2 | 9/2014 | Nagatsu et al. | |
| 8,875,685 | B2 | 11/2014 | McNeil | |
| 8,904,994 | B2 | 12/2014 | Michikawauchi et al. | |
| 8,935,996 | B2 | 1/2015 | Mulye | |
| 8,944,036 | B2 | 2/2015 | Klingbeil | |
| 8,997,698 | B1 | 4/2015 | Roth et al. | |
| 9,038,608 | B2 | 5/2015 | Vigild et al. | |
| 9,046,064 | B2 | 6/2015 | Sales | |
| 9,097,219 | B2 | 8/2015 | Sales | |
| 9,109,498 | B2 | 8/2015 | Bradley et al. | |
| 9,234,468 | B2 | 1/2016 | Coldren | |
| 9,234,482 | B2 | 1/2016 | Bromberg et al. | |
| 9,243,579 | B2 | 1/2016 | Pruemm | |
| 9,249,740 | B2 | 2/2016 | Matsuda et al. | |
| 9,267,485 | B2 | 2/2016 | Ravi et al. | |
| 9,291,110 | B2 | 3/2016 | Matsuda et al. | |
| 9,410,509 | B2 | 8/2016 | Roth et al. | |
| 9,422,494 | B2 | 8/2016 | Bradin | |
| 9,447,724 | B2 | 9/2016 | Morris et al. | |
| 9,499,043 | B2 | 11/2016 | Zocher et al. | |
| 9,512,808 | B2 | 12/2016 | Cleary | |
| 9,518,543 | B2 | 12/2016 | Kosuge et al. | |
| 9,546,617 | B2 | 1/2017 | Fujimoto et al. | |
| 9,556,845 | B2 | 1/2017 | Sasaki | |
| 9,587,553 | B2 | 3/2017 | Fischer | |
| 9,593,284 | B2 | 3/2017 | Morris | |
| 9,689,320 | B2 | 6/2017 | Yagi et al. | |
| 9,726,122 | B2 | 8/2017 | Geckler et al. | |
| 9,752,514 | B2 | 9/2017 | Amaral et al. | |
| 9,790,868 | B2 | 10/2017 | Huang et al. | |
| 9,810,139 | B2 | 11/2017 | Gruber et al. | |
| 9,850,808 | B2 | 12/2017 | Kare et al. | |
| 9,863,305 | B1 | 1/2018 | Kolodziej et al. | |
| 9,874,191 | B2 | 1/2018 | Xiao et al. | |
| 9,903,262 | B2 | 2/2018 | Edwards et al. | |
| 9,932,894 | B2 | 4/2018 | Sturman | |
| 9,976,517 | B2 | 5/2018 | Fiveland et al. | |
| 10,030,589 | B1 | 7/2018 | Kim | |
| 10,054,085 | B2 | 8/2018 | Foege | |
| 10,066,554 | B2 | 9/2018 | Casamassima | |
| 10,082,109 | B2 | 9/2018 | Engfehr et al. | |
| 10,100,719 | B2 | 10/2018 | Moore | |
| 10,119,482 | B1 | 11/2018 | Kim | |
| 10,174,703 | B2 | 1/2019 | Zhou | |
| 10,197,019 | B2 | 2/2019 | Shimada et al. | |
| 10,233,850 | B2 | 3/2019 | Roth et al. | |
| 10,253,688 | B2 | 4/2019 | Arboleda | |

(56) References Cited

U.S. PATENT DOCUMENTS

| | | | | |
|---|---|---|---|---|
| 10,260,430 | B2 | 4/2019 | Moore | |
| 10,273,914 | B2 | 4/2019 | Windbergs | |
| 10,301,991 | B1 | 5/2019 | Dudar | |
| 10,358,971 | B2 | 7/2019 | Ochi et al. | |
| 10,364,771 | B2 | 7/2019 | Ochi | |
| 10,378,462 | B1 | 8/2019 | Hamad et al. | |
| 10,458,307 | B2 | 10/2019 | Doers et al. | |
| 10,494,992 | B2 | 12/2019 | Johnson et al. | |
| 11,286,019 | B2 | 3/2022 | Hedlund et al. | |
| 11,415,068 | B2 | 8/2022 | Ferrara et al. | |
| 11,428,186 | B2 | 8/2022 | Blumreiter et al. | |
| 11,505,263 | B2 | 11/2022 | Hedlund et al. | |
| 11,542,856 | B2 | 1/2023 | Edwards et al. | |
| 2002/0157619 | A1 | 10/2002 | Gray | |
| 2003/0056752 | A1 | 3/2003 | Sukegawa et al. | |
| 2005/0126551 | A1 | 6/2005 | Mello et al. | |
| 2007/0125337 | A1 | 6/2007 | Robinet | |
| 2007/0227492 | A1* | 10/2007 | Cheiky | F02M 51/0671 123/304 |
| 2007/0227493 | A1* | 10/2007 | Cheiky | F02M 27/02 123/304 |
| 2008/0140300 | A1 | 6/2008 | Kuo et al. | |
| 2008/0230041 | A1 | 9/2008 | Brusslar et al. | |
| 2008/0310478 | A1 | 12/2008 | Mulders et al. | |
| 2010/0050990 | A1 | 3/2010 | Magel | |
| 2011/0000470 | A1 | 1/2011 | Roth | |
| 2011/0023819 | A1 | 2/2011 | Ives et al. | |
| 2011/0265770 | A1 | 11/2011 | Malfa et al. | |
| 2013/0213349 | A1 | 8/2013 | Sellnau et al. | |
| 2014/0297159 | A1 | 10/2014 | Surnilla et al. | |
| 2015/0096531 | A1 | 4/2015 | Zhou | |
| 2015/0114339 | A1 | 4/2015 | Sellnau et al. | |
| 2015/0240758 | A1 | 8/2015 | Fujimoto et al. | |
| 2016/0108857 | A1 | 4/2016 | Kanafani | |
| 2016/0237362 | A1 | 8/2016 | Olah et al. | |
| 2017/0022924 | A1 | 1/2017 | Fujimoto et al. | |
| 2017/0114748 | A1 | 4/2017 | Roth et al. | |
| 2017/0159594 | A1 | 6/2017 | Roth et al. | |
| 2017/0355915 | A1* | 12/2017 | Yang | C10L 1/1824 |
| 2018/0030907 | A1 | 2/2018 | Bhosekar et al. | |
| 2018/0180013 | A1 | 6/2018 | Sellnau et al. | |
| 2018/0209326 | A1 | 7/2018 | Sturman | |
| 2018/0283262 | A1 | 10/2018 | Chang et al. | |
| 2018/0306098 | A1* | 10/2018 | Edwards | F02D 41/1446 |
| 2019/0085776 | A1 | 3/2019 | Tate, Jr. et al. | |
| 2019/0249597 | A1 | 8/2019 | Asai | |
| 2019/0285027 | A1 | 9/2019 | Pontet | |
| 2019/0309696 | A1 | 10/2019 | Youso et al. | |
| 2019/0323457 | A1 | 10/2019 | Rohrssen et al. | |
| 2019/0390627 | A1 | 12/2019 | Youso et al. | |
| 2021/0054777 | A1 | 2/2021 | Blumreiter et al. | |
| 2023/0129315 | A1 | 4/2023 | Blumreiter et al. | |

FOREIGN PATENT DOCUMENTS

| | | | | |
|---|---|---|---|---|
| JP | S59152031 | A | 8/1984 | |
| JP | S6480756 | A | 3/1989 | |
| WO | WO-2006078935 | A1 * | 7/2006 | F01L 1/34409 |
| WO | WO-2008146066 | A2 * | 12/2008 | F02F 3/28 |
| WO | WO-2014108969 | A1 | 7/2014 | |
| WO | WO-2016023752 | A1 | 2/2016 | |
| WO | WO-2016125380 | A1 | 8/2016 | |
| WO | WO-2018211853 | A1 * | 11/2018 | F02D 43/00 |
| WO | WO-2019017060 | A1 | 1/2019 | |
| WO | WO-2020232287 | A1 * | 11/2020 | F02M 26/13 |

OTHER PUBLICATIONS

Dhinagar, S.J. et al. (1995) "Spark-Assisted Alcohol Operation in a Low Heat Rejection Engine" International Congress and Exposition, Detroit, MI, Feb. 27-Mar. 2, 1995. Society of Automotive Engineers (SAE) Technical Paper Series, Paper No. 950059; 11 pages.

Emonts, B. et al. (1998) "Compact methanol reformer test for fuel-cell powered light-duty vehicles" J Power Sources, 71:288-293.

ETIP Bioenergy (2021) "Transesterification to biodiesel" [online]. Retrieved from: https://www.etipbioenergy.eu/value-chains/conversion-technologies/conventional-technologies/transesterification-to-biodiesel; 3 pages.

Fleisch, T. et al. (1995) "A New Clean Diesel Technology: Demonstration of ULEV Emissions on a Navistar Diesel Engine Fueled with Dimethyl Ether" International Congress and Exposition, Detroit, MI, Feb. 27-Mar. 2, 1995. Society of Automotive Engineers (SAE) Technical Paper Series, Paper No. 950061; 14 pages.

Green, C.J. et al. (1990) "Dimethyl Ether as a Methanol Ignition Improver: Substitution Requirements and Exhaust Emissions Impact" International Fuels and Lubricants Meeting and Exposition, Tulsa, OK, Oct. 22-25, 1990. Society of Automotive Engineers (SAE) Technical Paper Series, Paper No. 902155; pp. 79-88.

International Preliminary Report on Patentability, mailed Nov. 25, 2021, for International Application No. PCT/US2020/032961 (16 total pages).

International Search Report and Written Opinion, mailed Sep. 2, 2020, for International Application No. PCT/US2020/032961 (20 pages).

Johnson, B. and C. Edwards (Apr. 8, 2013) "Exploring the Pathway to High Efficiency IC Engines through Exergy Analysis of Heat Transfer Reduction" SAE Int. J. Engines, 6(1):150-166; doi:10.4271/2013-01-0278.

Miyamoto, N. et al. (1998) "Smokeless, Low NOx, High Thermal Efficiency, and Low Noise Diesel Combustion with Oxygenated Agents as Main Fuel" International Congress and Exposition, Detroit, MI, Feb. 23-26, 1998. Society of Automotive Engineers (SAE) Technical Paper Series, Paper No. 980506; 9 pages.

Moss, G.P. et al. (1995) "Glossary of class names of organic compounds and reactive intermediates based on structure. IUPAC Recommendations 1995" Pure & Appl Chem, 67(8/9):1307-1375.

Ryan, T.W. et al. (1994) "Combustion and Emissions Characteristics of Minimally Processed Methanol in a Diesel Engine Without Ignition Assist" International Congress and Exposition, Detroit, MI, Feb. 28-Mar. 3, 1994. Society of Automotive Engineers (SAE) Technical Paper Series, Paper No. 940326; 10 pages.

Shen, M. et al. (Apr. 8, 2013) "Close to Stoichiometric Partially Premixed Combustion—The Benefit of Ethanol in Comparison to Conventional Fuels" Society of Automotive Engineers (SAE) Technical Paper Series, Paper No. 2013-01-0277, doi:10.4271/2013-01-0277; 16 pages.

Siebers, D.L. and C.F. Edwards (1987) "Auto Ignition of Methanol and Ethanol Sprays under Diesel Engine Conditions" International Congress and Exposition, Detroit, MI, Feb. 23-27, 1987. Society of Automotive Engineers (SAE) Technical Paper Series, Paper No. 870588; 16 pages.

Toepel, R.R. et al. (1983) "Development of Detroit Diesel Allison 6V-92TA Methanol Fueled Coach Engine", Fuels and Lubricants Meeting, San Francisco, CA, Oct. 31-Nov. 3, 1983. Society of Automotive Engineers (SAE) Technical Paper Series, Paper No. 831744; 20 pages.

Yanowitz, J. et al. (Feb. 2017) Compendium of Experimental Cetane Numbers. National Renewable Energy Laboratory (NREL), U.S. Department of Energy. Technical Report NREL/TP-5400-67585; 78 pages.

* cited by examiner

SYSTEMS AND METHODS FOR COMBUSTING UNCONVENTIONAL FUEL CHEMISTRIES IN A DIESEL ENGINE ARCHITECTURE

CROSS-REFERENCES TO RELATED APPLICATIONS

This application is a continuation of U.S. patent application Ser. No. 18/094,462, filed Jan. 9, 2023, which is a continuation of U.S. patent application Ser. No. 18/088,318, filed Dec. 23, 2022, which is a continuation of U.S. application Ser. No. 17/092,474, filed Nov. 9, 2020, now abandoned, which is a continuation of International Patent Application No. PCT/US2020/032961, filed May 14, 2020, which claims priority and the benefit of U.S. Provisional Application No. 62/848,087, filed May 15, 2019, the entire disclosures of which are hereby incorporated by reference herein in their entireties.

BACKGROUND

The diesel engine, also known as the mixing controlled compression ignition (MCCI, or CI) engine, is an important staple of the energy landscape with several advantages over the spark ignition (SI) engine used in conventional gasoline vehicles. The CI design of the diesel engine leads to high efficiency and good torque/power density, while the robust nature of the design enables the vaunted reliability and low maintenance of these engines, which can often drive over one million miles in on-road applications. Therefore, diesel engines are optimal in long-distance, short downtime scenarios. However, diesel engines are not without their drawbacks. In addition to a higher initial cost than conventional SI engines, they are difficult to start in cold climates due to the thermal requirements of MCCI operation, particularly with low-cetane fuels.

SUMMARY

Embodiments disclosed herein relate generally to systems and methods of operating internal combustion (IC) engines, and more specifically to systems and methods of starting compression ignition (CI) engines when the surrounding environment is significantly colder than the normal operating temperature of the engine (i.e., "cold-starting"). In some embodiments, an assisting device such as a glow plug, a spark plug, or a plasma ignition device can be used during cold-start until the engine reaches a temperature at which autoignition occurs. In some embodiments, a CI engine includes an engine cylinder having an inner surface, a head surface, a piston disposed and configured to move in the engine cylinder, an intake valve, an exhaust valve, and an ignition-assist device. In some embodiments, the inner surface of the engine cylinder, the piston, the head surface, the intake valve, and the exhaust valve can define a combustion chamber. In some embodiments, the piston and the head surface can define a bowl region of the combustion chamber. In some embodiments, the ignition-assist device can be positioned in the bowl region of the combustion chamber. In some embodiments, a method of operating the CI engine can include opening the intake valve to draw a volume of air into the combustion chamber. In some embodiments, the volume of air can have a mass-average temperature of less than about 150° C. at the moment the volume of air passes through the intake valve. The method of operating the CI engine can further include moving the piston from a bottom-dead-center (BDC) position to a top-dead-center (TDC) position in the combustion chamber at a compression ratio of between about 15 and about 25, injecting a volume of fuel at an engine crank angle between 0 and 360 degrees. In some embodiments, the fuel can have a cetane number of less than about 30. The volume of fuel and the volume of air can form an air-fuel mix. The method of operating the CI engine can further include closing the intake valve, and combusting substantially all of the volume of fuel. In some embodiments, at least about 50% of the volume of fuel can be pre-mixed with the volume of air immediately prior to ignition.

DETAILED DESCRIPTION

Figure 1:
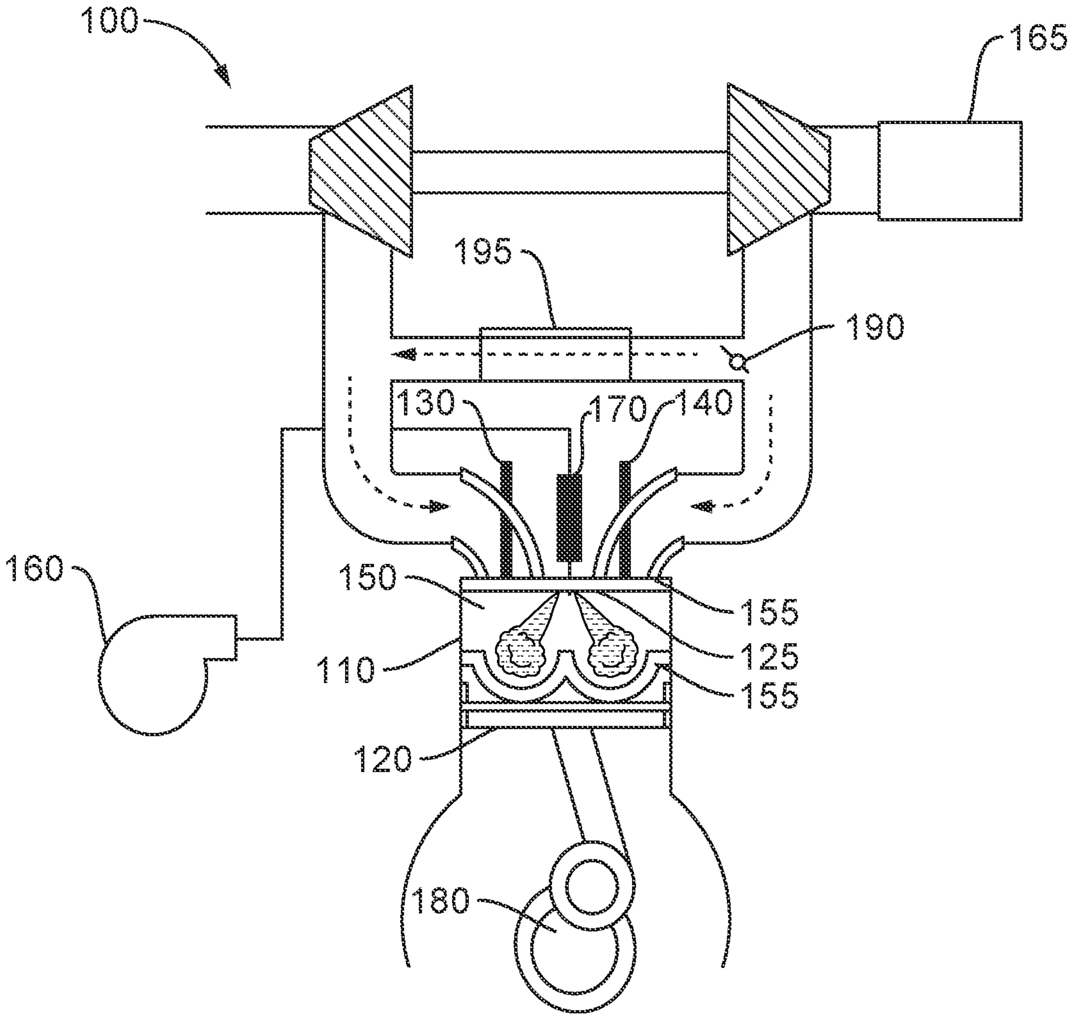
FIG. 1 is a schematic illustration of a compression ignition architecture, according to an embodiment.

Chemical fuels (petroleum, alcohols, biodiesel, etc.) remain important to heavy-duty on-road transportation. Their high energy density is important for users who need to travel long distances and refuel quickly. As a result, the need for chemically fueled diesel engines will persist for decades. However, diesel fuel prices have increased substantially over the last three decades and diesel fuel is a significant contributor to greenhouse gas emissions. Additionally, emissions standards for nitrogen dioxide and nitric oxide (collectively referred to as NOx) as well as soot are becoming ever stricter.

The use of cleaner low-carbon alternative fuels, such as methanol, ethanol, dimethyl ether (DME), and natural gas, has consistently become more prevalent on the energy landscape of the United States over the past two decades. Between 2000 and 2018, ethanol production rose from 1.6 billion to 16.1 billion gallons annually in the U.S., a ten-fold increase. During the same time period, natural gas production has increased by approximately 30% in the United States and methanol production has also experienced significant increases. While petroleum-based fuels still provide approximately 85-90% of U.S. energy needs in the transportation sector, the market share for alternative fuels (e.g. methanol, ethanol, biodiesel) and natural gas are expected to grow consistently over the next several decades. These alternative fuels are attractive not only as a means of supplementing the provisions of the petroleum industry to meet energy demand, but also as a way of reducing the greenhouse gas, soot, and $NO_x$ emissions associated with the transportation sector. Fuel with approximately 80-85 wt % ethanol releases less than 40% as much carbon dioxide as conventional petroleum-based fuel on a per-mile basis.

Other alternative fuels experience similar reductions in greenhouse gas emissions, when compared to conventional petroleum-based fuels. Additionally, emissions of carbon monoxide, volatile organic compounds (VOC's), and $NO_x$ can be reduced significantly when these alternative fuels are used.

The use of clean low-carbon alternative fuels, such as methanol and ethanol, in the CI architecture are an important innovative step in meeting energy demand and reducing harmful emissions, however, these fuels have low-cetane characteristics, which means they require higher temperatures to achieve autoignition when compared to long-chain hydrocarbons (i.e. six carbon molecules or more in a chain). Cetane number is an indicator of the ignition propensity of a fuel in a CI engine, and the temperature threshold for autoignition to occur. Due to the higher autoignition temperature, these fuel types have an even greater difficulty igniting in cold temperatures than conventional diesel fuels.

Embodiments disclosed herein relate generally to systems and methods of operating internal combustion (IC) engines, and more specifically to systems and methods of starting IC engines when the surrounding environment is significantly colder than the normal operating temperature of the engine (i.e., "cold-starting"). In other words, when an engine block is very cold due to ambient cold temperatures, starting the engine is more difficult than starting an engine than has been run recently (typically between 90 minutes and 2 hours). Cold-starting is more difficult for multiple reasons including: (1) lack of heat makes ignition of the fuel more difficult, (2) lower temperatures causes engine oil to become more viscous, making it more difficult to circulate, and (3) the air-fuel ratio is impacted by the colder air, which in turn affects the flammability of the mixture.

There are two types of engines used most commonly in vehicles: spark ignition (SI), most commonly used in gasoline engines and compression ignition (CI), most commonly used in diesel engines. In a standard four-stroke SI engine architecture, the chemical energy in the fuel (e.g., gasoline) is converted to mechanical energy due to ignition of the fuel within a combustion chamber. The external boundaries of a combustion chamber are delineated by an engine cylinder, a piston configured to move in the cylinder, a head surface, an intake valve (or valves), and an exhaust valve (or valves). During operation, the piston completes four separate strokes while turning a crankshaft. First, during the intake or suction stroke, the piston moves from a position at the top of the combustion chamber (i.e., top-dead-center (TDC)) to a position at the bottom of the combustion chamber (i.e., bottom-dead-center (BDC)). The term "dead-center" indicates the relative position of the crankshaft with respect to lateral movements, as it is rotating about a central axis beneath the combustion chamber. During the intake stroke, the intake valve is open and gas is drawn in through the intake valve. The gas can be either an air-fuel mixture, or simply air, in which case the fuel is injected directly into the chamber for mixing. The intake valve is then closed prior to the second stroke, creating a sealed environment within the combustion chamber. The second stroke is the compression stroke, in which the piston moves from BDC back to TDC. In this stroke, the piston compresses the air-fuel mixture in preparation for ignition. By the end of this stroke, the crankshaft has completed a full 360 degree revolution. The third stroke is the combustion stroke, in which a spark plug ignites the compressed air-fuel mixture. The ignited mixture expands and pushes the piston back to BDC and produces mechanical work on the crankshaft. During the fourth stroke, the piston moves back from BDC to TDC with the exhaust valve open, to expel the exhaust gas (i.e., the products of combustion).

The operation of a CI engine is very similar to the operation of SI engines. A standard four-stroke CI engine employs the same four strokes as an SI engine, with key differences in the compression and ignition strokes. During the compression stroke, the compression ratio (the ratio of the combustion chamber volume at BDC to combustion chamber volume at TDC) is substantially higher than that of SI engines, reaching values of 17:1 or higher. This significant compression causes a dramatic rise in temperature and pressure and brings the air-fuel mix to its autoignition temperature (if pre-mixed) or injects fuel into air that is already above the required autoignition temperature (if mixing limited), such that the ignition stroke occurs without the employment of a spark. This type of engine architecture generally produces higher torque output and is engineered to be more robust than the SI engine architecture. Hence, the CI engine design yields reliable performance on a relatively long timeframe.

While the benefits of clean low-carbon fuels are well established, one of the drawbacks is that they have relatively low vapor pressure and autoignition capability, when compared to gasoline. During colder months, E85 fuel is often supplemented with a greater amount of petroleum-based gasoline than in warmer months in order to meet winter fuel volatility requirements. Winter-blend E85 typically contains only about 70% ethanol as opposed to 83% in the summer blend. As long as the E85 fuel has enough volatility, the cold-starting system and process for SI engines is substantially the same as for pure petroleum-based fuels. With the proper amount of volatile fuel vaporized within the combustion chamber, ignition occurs regardless of temperature. However, the CI architecture adds an additional layer of difficulty in achieving ignition. As described above, cleaner low-carbon fuels typically have a low cetane rating, which makes it more difficult to achieve autoignition with neat methanol or ethanol in a diesel engine. Since these alcohols have cetane numbers of about 1 to 15, compared to traditional diesel fuel with a cetane number of about 45, the temperature of the air and ensuing air-fuel mixtures at TDC is typically insufficient to achieve ignitability requirements for either alcohol.

Examples of systems and methods of operating a CI engine with low-cetane fuels are described in U.S. Pat. No. 9,903,262 entitled, "Stoichiometric High-Temperature Direct-Injection Compression-Ignition Engine," filed Apr. 6, 2015 ("the '262 Patent"), the disclosure of which is incorporated herein by reference in its entirety. These methods include a short ignition delay, and mixing controlled combustion, which requires approximately 800° C. pre-injection temperature for these fuels. As described in the '262 patent, there are many benefits of an engine that operates under the conditions of high temperature with low-carbon fuels. Specifically, soot emissions are substantially lower than with the use of conventional diesel fuels.

Regardless of fuel type, the CI engine architecture experiences several issues that are not as common in SI engines. In a CI engine, sufficient thermal energy is necessary for autoignition to occur, while this is not the case for spark assisted ignition. While the '262 patent describes retention of exhaust gas to provide thermal energy for steady state operation, exhaust gas is not available upon initial engine startup, and low cylinder wall temperatures prevent the intake charge from reaching the approximately 800° C. air temperature suitable for CI low-cetane fuel autoignition. In addition, starting CI engines in cold environments can be even more challenging, given the relative lack of thermal energy available for autoignition to occur within the combustion chamber. If the combustion chamber's surroundings are at a low temperature, the surroundings draw a large amount of thermal energy generated in the compression stroke away from the combustion chamber, making autoignition very difficult.

Cold-starting with low-cetane fuels (e.g., methanol, ethanol, or natural gas) adds an additional layer of difficulty, as low-cetane fuels have even higher autoignition temperatures than diesel. As CI engines using low-cetane fuels rely on high ignition temperature and exhaust utilization, it can be challenging to develop a cold-start strategy for when there is inadequate thermal energy to begin or sustain ignition of low-cetane fuels in order to reach steady state operation. That said, the high-octane nature of most low-carbon fuels provides a unique opportunity for engine cold-start.

Embodiments disclosed herein relate to systems and methods of cold-starting a CI engine that runs on low-cetane fuels. FIG. 1 shows a compression ignition (CI) engine 100 that includes a cylinder 110, a piston 120 configured to move in the cylinder 110, an intake valve 130, and an exhaust valve 140. The cylinder 110, piston 120, head deck 125, intake valve 130, and exhaust valve 140 collectively define the combustion chamber 150. The intake valve 140 and the exhaust valve 150 can both be in contact with camshafts (not shown) that rotate to open and close the intake valve 140 and the exhaust valve 150 in accordance with the timing and distance necessary to achieve the desired air intake. While a spring holds the intake or exhaust valve in a closed position, the oblong shape of the cam pushes against the valve at varying lengths relative to the central axis of the camshaft, creating the open and closed positions of the valves. Said another way, when the longer (in relation to the distance from the central axis of the camshaft) side of the oblong cam contacts the valve, the valve is pushed into the open position. When the shorter side of the cam contacts the valve, the spring pushes the valve to the closed position. In some instances, the engine employs multiple camshafts, whereby one camshaft controls the intake valve or valves while another camshaft controls the exhaust valve or valves. Camshafts can often vary the timing of the valves opening and closing via a variable valve timing (VVT) scheme. The simplest form of VVT is cam-phasing, whereby the phase angle of the camshaft rotates forwards or backwards relative to the crankshaft. This changes the timing of the valve opening, but not the amount of lift provided by the camshaft or the opening duration. More complex or "asymmetric" VVT can also be implemented, in which the lift and opening duration can be modified and/or the timing adjustment of the intake valve 130 can be different from the timing adjustment of the exhaust valve 140. In some embodiments, the intake valve 130 and exhaust valve 140 open and close via hydraulic actuation, electronic actuation, or other means, rather than via camshafts.

The CI engine 100 also includes a source of fuel 160 fluidically coupled to a fuel injector 170 that injects fuel into the combustion chamber 150. The fuel 160 can include conventional fuels such as gasoline or diesel fuels, or low carbon/low-cetane fuels such as methanol, ethanol, or natural gas, or low carbon/high-cetane dimethyl ether.

In some embodiments, the CI engine 100 can operate according to a stratified mixing-controlled compression ignition (MCCI) strategy. In standard MCCI operation, the fuel injector 170 sprays a fixed amount of a finely atomized fuel 160 into the combustion chamber 150 near the point when the piston 120 reaches TDC (within ~15 crank angle degrees). The fuel 160 quickly vaporizes and ignites within the combustion chamber 150, albeit not in a uniform manner. The fuel 160 at the front of the spray stream is in contact with the heat and the oxygen within the chamber first, and the fuel 160 at the front ignites first. This creates a flame front at the contact point between the fuel 160 and the compressed air. There are drawbacks and advantages associated with this heterogeneous flame and fuel concentration gradient. One of the drawbacks is the potential for incomplete combustion of the fuel 160, and the production of undesired combustion products, such as soot, carbon monoxide (CO), and $NO_x$. A three-way catalyst 165 is typically used to reduce these harmful emissions from the exhaust in a stoichiometric fuel feed. The three-way catalyst 165 is often placed downstream of the exhaust valve 140 and includes precious metals, such as rhodium, platinum, palladium, and some metal oxides. The three-way catalyst 165 is most effective in a stoichiometric feed of the fuel 160 because it facilitates the reaction between CO and $NO_x$ to produce $CO_2$ and nitrogen gas. A fuel-rich mixture causes more CO to contact the catalyst, and the CO remains unreacted. A lean fuel mixture with excess air causes more $NO_x$ to contact the catalyst, which then remains unreacted.

One advantage associated with stratified MCCI engine operation is that it minimizes engine knock, which occurs due to untimely fuel combustion, specifically when a premixed fuel-air charge autoignites from compression prior to the desired timing. In MCCI operation, only air (or air with small amounts of fuel and/or exhaust) is compressed during the compression stroke, which eliminates the possibility of knock given the lack of fuel. After injection, a stratified charge of fuel 160 through the fuel injector 170 creates locally rich points of fuel 160 that can combust timely, and with short ignition delay, to avoid knock. In other words, timing and rate of fuel combustion is limited by the timing and rate of fuel injection. Turbulence in the stream of the fuel 160 as it is injected into the combustion chamber 150 aids in bringing as many oxygen molecules available within the combustion chamber into contact with the atomized droplets of fuel 160. This reduces the physical delay between the fuel droplet vaporization and the combustion. Delaying and reducing air-fuel mixing and homogeneity within the combustion chamber 150 can ultimately reduce the likelihood of knock.

In some embodiments, the CI engine 100 can operate according to a homogeneous charge compression ignition (HCCI) strategy. HCCI differs from MCCI, in that HCCI involves combusting a substantially homogeneous air-fuel mixture. In some embodiments, HCCI operation is achieved by delivering fuel 160 through the fuel injector 170 during the intake stroke while the piston 120 is moving from TDC to BDC. In some embodiments, the fuel injector can be placed just outside of the combustion chamber 150 near the intake valve 130 in order to further facilitate pre-mixing of the fuel 160 and air before entry into the combustion chamber 150 and yield a substantially homogeneous air-fuel mixture during compression and ignition. HCCI operation has several advantages. First, combustion of the fuel 160 in an HCCI setup tends to be more complete and efficient. This not only improves fuel economy, but also tends to more selectively produce the anticipated combustion products of water and $CO_2$. In other words, $NO_x$ and CO emissions are reduced in the HCCI setup. However, HCCI operation generally has a narrow operating range at which it is the optimal combustion strategy. If the temperature within the combustion chamber 150 is too low, ignition performance is simply not supported, as the proper amount of thermal energy cannot be supplied to create a combustion event throughout the combustion chamber 150. In contrast to MCCI operation, when the temperature within the combustion chamber 150 is too high, knock can occur due to untimely (early) combustion events of the fuel 160.

In some embodiments, exhaust gas can flow past the lines transferring the incoming fuel 160 to facilitate heat transfer to the incoming fuel 160, thereby reducing the thermal energy loss from the fuel 160 associated with pre-ignition evaporative cooling. Similarly, thermal energy can be transferred from the exhaust to the intake air flow, to increase the temperature for autoignition. Additionally, gas flow contacting the EGR cooler 195 can increase the temperature of coolant in contact with the EGR cooler 195. In general, a coolant reservoir (not shown) is disposed throughout the engine 100 and surrounds each cylinder 110, where heat from combustion transfers to the coolant liquid within the reservoir. The coolant then flows to a radiator (not shown), where a fan aids the transfer of heat from the coolant to the ambient air. In some embodiments, the circulation of coolant throughout the engine 100 can be reduced or controlled such that the temperature within the combustion chamber 150 rises quickly. Reducing the amount of coolant flowing past each cylinder 110 effectively reduces the amount of thermal energy transferred out of the combustion chamber 150, which can cause the temperature within the combustion chamber to increase faster than with a full circulation of coolant fluid.

In some embodiments, in tandem with the aforementioned methods, decreasing intake pressure in the engine 100 can mitigate knock. Decreasing the intake pressure can reduce the amount of fuel necessary to maintain the proper air-fuel ratio, while reducing the pressure within the combustion chamber 150. This lower pressure effectively lowers the overall probability of autoignition.

In some embodiments, the CI engine 100 can include a thermal barrier coating 155 to help retain thermal energy in the combustion chamber 150 to maintain high temperatures for combustion. As described in the '262 patent, the thermal barrier coating 155 can be applied on the liner of the cylinder 110, the face of the piston 120, the surfaces of the intake valve 130 and exhaust valve 150, the interior of the combustion chamber 150, and the cylinder head (not shown). In some embodiments, the thermal barrier coating 155 can be applied throughout the entire intake and exhaust system of the engine 100, including a recirculation port 190 and EGR cooler 195.

In some embodiments, an intake preheating system can be used to aid in cold-start. An intake heater-cartridge system may be located just upstream of the intake valve 130, reducing heat transfer losses between the heater and the engine. This system configuration is similar to the cold-start assist utilized in many commercial diesel engines. However, even greater levels of preheating are needed due to the high autoignition resistance of low-cetane fuels, although that need can be lessened by providing extra exhaust retention or other forms of combustion assistance. Similarly, a block heater (not shown) can be installed within the engine 100 or external to the engine 100 in order to aid in ignition at low ambient temperatures. In some embodiments, the block heater can be installed in the cylinder block to heat the cylinder 100. In some embodiments, the block heater can heat the oil reservoir (not shown) near a crankshaft 180, in order to reduce the oil viscosity upon startup. In some embodiments, multiple block heaters can be installed in and around the engine 100. In some embodiments, a block heater can be permanently installed in and around the engine 100. In some embodiments, a block heater can be removable, such that its use is seasonal.

In some embodiments, the engine 100 can include a pilot fuel injector (not shown), which injects a high-cetane fuel into the combustion chamber 150 during cold-start. A fuel with a low thermal barrier to autoignition can aid in igniting the engine during cold-start, and can be slowly phased out during the transition to steady state MCCI operation. In some embodiments, the high-cetane fuel can be kept in a separate tank from the fuel 160. In some embodiments, the tank holding the high-cetane fuel can be substantially smaller than the tank holding the fuel 160. In some embodiments, the high-cetane fuel can be diesel. In some embodiments, the high-cetane fuel can be dimethyl ether.

While the central challenge of engine cold-start is to reach stable idle speeds (approximately 750 RPM), maintaining exhaust emissions within regulated limits during startup is equally important. The three-way catalyst 165 commonly has an operating temperature of at least approximately 250° C. This high temperature is an important quality in achieving the exothermic oxidation of incomplete combustion products, at which point the exothermic nature of the reaction can be used to sustain catalyst operation in a process known as catalyst light-off. Before light-off is achieved, untreated unburned hydrocarbons, CO, and $NO_x$ can be emitted from the engine 100. Given the low emissions thresholds that should be met for the engine 100 to maintain regulatory compliance, the cold-start period is an important period, in which harmful pollutants should be aggressively mitigated. As such, it is important to ensure that catalyst light-off is achieved quickly, and with minimal levels of pollutants emitted prior to reaching catalyst light-off. In some embodiments, the cold-start methods described herein can minimize pollutant formations by reaching light off temperatures in less than 60 seconds. In some embodiments, the use of thermal barrier coating 155 throughout the intake and exhaust ports of the engine 100 can be an important component in retaining as much thermal energy as possible to aid the three-way catalyst 165 in achieving light-off temperatures. In some embodiments, heating elements can be added to the three-way catalyst, to decrease the time needed to achieve light off temperatures. In some embodiments, each of the aforementioned cold-start methods can be instrumental in aiding the achievement of catalyst light-off.

Achieving stable idle operation is important for any cold-start strategy, but it is not necessarily sufficient to make a strategy suitable for adoption by the original equipment manufacturer. Just as emissions should remain low enough during cold-start to meet regulations, combustion should be stable enough to meet users' expectations of reliability and noise, vibration, and harshness (NVH) during cold-start. At low temperatures, significant variations may exist in combustion between different cycles. In some embodiments of cold-start via the methods described herein, minimizing these variations can help to achieve an acceptable level of combustion stability. Specifically, the coefficient of variation in indicated mean effective pressure (volume-normalized work produced in the combustion chamber during the operating cycle) between cycles should be less than about 5%.

In some embodiments, the engine 100 can include a glow plug (not shown) to provide the desired thermal energy to the fuel 160 to achieve autoignition, either by sufficiently heating the surrounding air, or by providing a hot surface for surface ignition. In some embodiments, the engine 100 can include a spark plug (not shown) to facilitate spark-assisted compression ignition. In some embodiments, the engine 100 can include plasma ignition type apparatus (not shown), similar to a spark plug, but with less spatial restriction on the boundaries of the high-energy plasma, to aid in cold-start.

The attributes of embodiments of the aforementioned methods would be different with thermal barrier coatings, when compared to embodiments without thermal barrier coatings. Thermal barrier coatings facilitate both cold-start ignition and early catalyst light-off, as well as the CI aspects of transition strategies such as SACI and HCCI.

Figure 2:
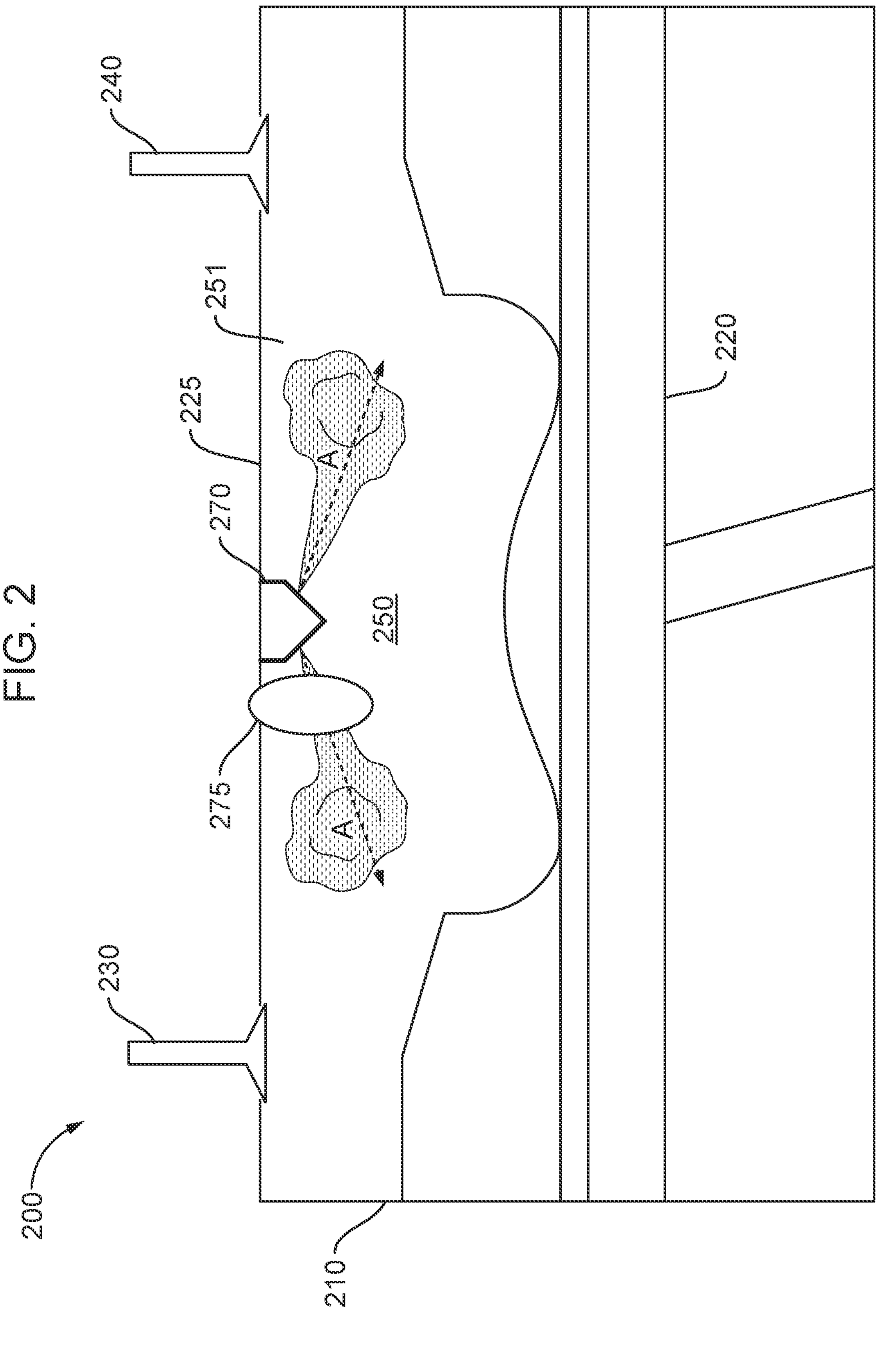
FIG. 2 is a schematic illustration of the placement of a glow plug or spark plug in a combustion chamber, according to an embodiment.

FIG. 2 shows a CI engine 200, according to an embodiment. The CI engine 200 includes a cylinder 210, a piston 220 configured to move in the cylinder 210, a head deck 225, an intake valve 230, and an exhaust valve 240. The cylinder 210, piston 220, intake valve 230, and exhaust valve 240 collectively define a combustion chamber 250. The CI engine 200, cylinder 210, piston 220, head deck 225, intake valve 230, exhaust valve 240, and combustion chamber 250 can be substantially similar or the same as the engine 100, cylinder 110, piston 120, head deck 125, intake valve 130, exhaust valve 140, and combustion chamber 150 as described above with reference to FIG. 1. Therefore, details of certain aspects of the CI engine 200 components are not described in further detail herein, and should be considered identical or substantially similar in form or function to the corresponding components described above with respect to the engine 100 unless explicitly described differently.

As shown in FIG. 2, a fuel injector 270 sprays fuel along line A toward an assisting device 275 while the piston 220 is in the TDC position or as the piston 220 approaches the TDC position. In other words, the assisting device 275 is positioned in the bowl region 251 of the combustion chamber 250 and in the direct spray path of the fuel injector 270. In some embodiments, placement of the assisting device 275 in the bowl region 251 can aid in inducing surface ignition (i.e., ignition of the fuel or fuel-air mix on the surface of the assisting device 275). In some embodiments, the assisting device 275 can be a glow plug. In a typical diesel fuel operation, a glow plug heats the air in the combustion chamber 250 to enable combustion during cold-start. However, in some embodiments of a low-cetane fuel CI engine 200, the heat provided to the air via the glow plug may not bring the air to the appropriate temperature for autoignition to occur. An advantage of placing aglow plug along line Ain the direct spray path of the fuel injector 270 is that it can facilitate direct contact between the fuel and the surface of the glow plug. This direct contact can enable ignition of the fuel on the surface of the glow plug. In other words, the fuel injector 270 can spray the fuel onto the hot solid surface of the glow plug with oxidizing molecules nearby to facilitate combustion directly on the hot solid surface. Given the higher heat capacity of the hot solid surface of the glow plug when compared to the heat capacity of nearby air, a greater amount of thermal energy transfer from the glow plug to the fuel, thereby facilitating ignition. This initial ignition event at the hot solid surface can facilitate successive ignition events away from the hot solid surface of the glow plug. In some embodiments, the glow plug can be coated with a material that catalytically assists alcohol, natural gas, and/or dimethyl ether combustion, including but not limited to transition metals. As shown, the fuel injector 270 injects fuel into the combustion chamber 250. In some embodiments, the fuel injector 270 can be positioned, such that the fuel injector 270 injects fuel into an intake port (not shown) external to the combustion chamber 250.

In addition to the aforementioned advantages, placing a glow plug along line A in the direct spray path of the fuel injector 270 can have additional inherent advantages when compared to other possible placement locations. Given the close proximity of the glow plug to the fuel injector 270, the air-fuel mixture is substantially heterogeneous when the air-fuel makes contact with the glow plug. This high level of heterogeneity gives a high probability of timely combustion and a low probability of untimely combustion and knock. However, this level of stratification in the fuel injection can ultimately lead to more unburned fuel in the exhaust stream and undesired CO and $NO_x$ emissions.

When operating the CI engine 200 with the use of a glow plug as the assisting device 275, there are two time delays to consider when facilitating cold-start in a CI engine with low-cetane fuels. The first time delay is the amount of time between the activation of the glow plug and the initial startup of the CI engine 200. The first time delay is a function of the rate at which heat is transferred from a power source to the glow plug and ultimately into the combustion chamber 250. The second time delay is the amount of time between the initial startup of the CI engine 200 and the completion of the transition of the CI engine 200 to steady state MCCI operation. The second time delay is a function of the exothermic nature of the combustion of the fuel within the combustion chamber 250. In some embodiments, the first time delay can be less than about one second, less than about 5 seconds, less than about 10 seconds, less than about 20 seconds, or less than about 30 seconds. In some embodiments, the second time delay can be less than about 30 seconds, less than about 45 seconds, less than about 60 seconds, less than about 90 seconds, or less than about 120 seconds.

In some embodiments, the assisting device 275 can be a spark plug, facilitating a process referred to as spark assisted compression ignition (SACI) or spark-assisted MCCI combustion. In other words, the use of a spark plug as the assisting device 275 in the combustion chamber 250 can provide a local spark to help initiate combustion when thermal energy is insufficient for conventional compression ignition. Placing a spark plug along line A in the direct spray path of the fuel injector 270 has inherent advantages and disadvantages, similar to those encountered with a glow plug. The degree of heterogeneity of the fuel as it contacts the spark plug gives a high probability of timely combustion and a low probability of untimely combustion and knock. However, this level of stratification in the fuel injection can ultimately lead to more unburned fuel in the exhaust stream and undesired CO and $NO_x$ emissions.

As described above, the use of alcohol-based fuels in a typical SI engine can create challenges for cold-start. However, the CI architecture utilizes a significantly higher compression ratio (i.e., approximately 17:1), which reduces the barrier to spark-assisted cold-start. Given the high volatility and ready vaporization of the low-cetane fuels described herein, the air and fuel can be well mixed and ignitable even at a low temperature.

In some embodiments, the compression ratio of the engines described herein can be at least about 15, at least about 16, at least about 17, at least about 18, at least about 19, at least about 20, at least about 21, at least about 22, at least about 23, or at least about 24. In some embodiments, the compression ratio of the engines described herein can be no more than about 25, no more than about 24, no more than about 23, no more than about 22, no more than about 21, no more than about 20, no more than about 19, no more than about 18, no more than about 17, or no more than about 16. Combinations of the above-referenced compression ratio ranges are also possible (e.g., at least about 15 and no more than about 25 or at least about 15 and no more than about 20), inclusive of all values and ranges therebetween. In some embodiments, the compression ratio of the engines described herein can be about 15, about 16, about 17, about 18, about 19, about 20, about 21, about 22, about 23, about 24, or about 25.

In some embodiments, the low-cetane fuels described herein can have a cetane number of at least about 1, at least about 5, at least about 10, at least about 15, at least about 20, or at least about 25. In some embodiments, the low-cetane fuels described herein can have a cetane number of no more than about 30, no more than about 25, no more than about 20, no more than about 15, no more than about 10, or no more than about 5. Combinations of the above-referenced cetane number ranges are also possible (e.g., at least about 1 and no more than about 30 or at least about 10 and no more than about 20), inclusive of all values and ranges therebetween. In some embodiments, the low-cetane fuels described herein can have a cetane number of about 1, about 5, about 10, about 15, about 20, about 25, or about 30.

In some embodiments, the fuel can be injected earlier in the cycle than is typical for MCCI operation. In a typical gasoline SI engine, fuel is injected earlier in the cycle than in a CI engine. This earlier injection leads to a more homogeneous air-fuel mixture. Given the reliable ignition source that a spark plug provides, the air-fuel mixture does not have to be as heterogeneous as with standard MCCI operation. Further, the high compression ratio of a CI engine can facilitate vaporization, mixing, and spark-assisted flame propagation. However, a completely homogeneous air-fuel mixture may not be desirable during cold-start. As described herein, a completely homogeneous air-fuel mixture may have difficulty igniting at low temperatures. This can be due to a lack of fuel-rich points in the air-fuel mixture and/or a lack of thermal energy in the air-fuel mixture. Conversely, a completely homogeneous air-fuel mixture can experience knock if temperatures rapidly become high enough.

In some embodiments, as the temperature in the combustion chamber 250 increases, fine-tuning the parameters of SACI implementation can aid in achieving efficient engine performance and mitigating knock. Altering the injection timing and the degree of homogeneity in the air-fuel mixture during the progression through the SACI regime is a potential strategy to achieve this effect. These alterations can also enable a transition into an HCCI type combustion strategy (in which combustion is initiated due to compression, not a spark plug), with varying degrees of stratification to limit untimely autoignition (i.e. knock). Additionally, greater homogeneity in the fuel can yield more efficient and complete fuel combustion. In some embodiments, the timing of the spark plug can be configured to only light while the combustion chamber 250 is closed, thereby controlling the times during which spark ignition can occur. In some embodiments, temperature sensors (not shown) within the combustion chamber 250, or elsewhere in the air/exhaust handling systems, can be used to control this timing scheme. In some embodiments, the air-fuel mixture in the combustion chamber 250 can be non-stoichiometric.

In some embodiments, the fuel can be injected during cold-start entirely during the intake stroke. In some embodiments, the fuel can be injected during cold-start partially during the intake stroke and partially during the compression stroke. In some embodiments, the fuel can be injected during cold-start at an engine crank angle of between about 0° and about 360°. In some embodiments, the fuel can be injected during cold-start at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, at least about 300°, or at least about 310°. In some embodiments, the fuel can be injected during cold-start at an engine crank angle of no more than about 320°, no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, no more than about 20°, or no more than about 10°. Combinations of the above-referenced crank angles for the injection of fuel during cold-start are also possible (e.g., at least about 0° and no more than about 3200 or at least about 1000 and no more than about 180°), inclusive of all values and ranges therebetween. In some embodiments, the fuel can be injected during cold-start at an engine crank angle of about 0°, about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, about 310°, or about 320°.

In some embodiments, fuel injection during cold-start can begin at a first engine crank angle and fuel injection during cold-start can end at a second engine crank angle. In other words, the fuel injection event during cold-start can last long enough, such that the engine crank angle changes significantly during the fuel injection event. In some embodiments, the fuel injection event during cold-start can begin at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, or at least about 300°. In some embodiments, the fuel injection event during cold-start can begin at an engine crank angle of no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, no more than about 20°, or no more than about 10°. Combinations of the above-referenced crank angles for the beginning of the fuel injection event during cold-start are also possible (e.g., at least about 0° and no more than about 3100 or at least about 1000 and no more than about 180°), inclusive of all values and ranges therebetween. In some embodiments, the fuel injection event during cold-start can begin at an engine crank angle of about 0°, about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, or about 310°.

In some embodiments, the fuel injection event during cold-start can end at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, at least about 300°, at least about 310°, at least about 320°, at least about 330°, at least about 340°, at least about 350°, at least about 360°, at least about 370°, or at least about 380°. In some embodiments, the fuel injection event during cold-start can end at an engine crank angle of no more than about 390°, no more than about 380°, no more than about 370°, no more than about 360°, no more than about 350°, no more than about 340°, no more than about 330°, no more than about 320°, no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, or no more than about 20°. Combinations of the above-referenced crank angles for the end of the fuel injection event during cold-start are also possible (e.g., at least about 100 and no more than about 3900 or at least about 1000 and no more than about 180°), inclusive of all values and ranges therebetween. In some embodiments, the fuel injection event during cold-start can end at an engine crank angle of about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, about 310°, about 320°, about 330°, about 340°, about 350°, about 360°, about 370°, about 380°, or about 390°.

In some embodiments, the fuel can be injected during cold-start at an injection pressure of at least about 1,000 bar. In other words, the pressure in the fuel injector 270 while the fuel is being injected can be at least about 1,000 bar. In some embodiments, the fuel can be injected during cold-start at an injection pressure of at least about 1,000 bar, at least about 1,100 bar, at least about 1,200 bar, at least about 1,300 bar, at least about 1,400 bar, at least about 1,500 bar, at least about 1,600 bar, at least about 1,700 bar, at least about 1,800 bar, at least about 1,900 bar, at least about 2,000 bar, at least about 2,100 bar, at least about 2,200 bar, at least about 2,300 bar, at least about 2,400 bar, at least about 2,500 bar, at least about 2,600 bar, at least about 2,700 bar, at least about 2,800 bar, or at least about 2,900 bar. In some embodiments, the fuel can be injected during cold-start at an injection pressure of no more than about 3,000 bar, no more than about 2,900 bar, no more than about 2,800 bar, no more than about 2,700 bar, no more than about 2,600 bar, no more than about 2,500 bar, no more than about 2,400 bar, no more than about 2,300 bar, no more than about 2,200 bar, no more than about 2,100 bar, no more than about 2,000 bar, no more than about 1,900 bar, no more than about 1,800 bar, no more than about 1,700 bar, no more than about 1,600 bar, no more than about 1,500 bar, no more than about 1,400 bar, no more than about 1,300 bar, no more than about 1,200 bar, or no more than about 1,100 bar. Combinations of the above-referenced injection pressures during cold-start are also possible (e.g., at least about 1,000 bar and no more than about 3,000 bar or at least about 1,500 bar and no more than about 2,000 bar), inclusive of all values and ranges therebetween. In some embodiments, the fuel can be injected during cold-start at an injection pressure of about 1,000 bar, about 1,100 bar, about 1,200 bar, about 1,300 bar, about 1,400 bar, about 1,500 bar, about 1,600 bar, about 1,700 bar, about 1,800 bar, about 1,900 bar, about 2,000 bar, about 2,100 bar, about 2,200 bar, about 2,300 bar, about 2,400 bar, about 2,500 bar, about 2,600 bar, about 2,700 bar, about 2,800 bar, about 2,900 bar, about 3,000 bar.

In some embodiments, a portion of the fuel injected during the fuel injection event can be injected during cold-start while the intake valve 230 is opened and a portion of the fuel injected during the fuel injection event can be injected while the intake valve 230 is closed. In other words, the fuel injection event can have a sufficient duration during cold-start, such that a portion of the fuel injected during the fuel injection event is injected before intake valve close (IVC) and a portion of the fuel injected during the fuel injection event is injected after IVC. In some embodiments, at least about 60%, at least about 65%, at least about 70%, at least about 75%, at least about 80% or at least about 85% of the fuel can be injected while the intake valve 230 is closed (i.e., after IVC) during cold-start, inclusive of all values and ranges therebetween. In some embodiments, no more than about 40%, no more than about 35%, no more than about 30%, no more than about 25%, no more than about 20%, or no more than about 15% of the fuel can be injected while the intake valve 230 is open (i.e., before IVC) during cold-start, inclusive of all values and ranges therebetween.

In some embodiments, the fuel injection timing can change from cold-start operation to HCCI operation (i.e., transition period between cold-start and steady state MCCI operation). In some embodiments, the fuel can be injected during HCCI entirely during the intake stroke. In some embodiments, the fuel can be injected during HCCI partially during the intake stroke and partially during the compression stroke. In some embodiments, the fuel can be injected during HCCI at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, at least about 300°, or at least about 310°. In some embodiments, the fuel can be injected during HCCI at an engine crank angle of no more than about 320°, no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, no more than about 20°, or no more than about 10°. Combinations of the above-referenced crank angles for the injection of fuel during HCCI are also possible (e.g., at least about 0° and no more than about 3200 or at least about 1000 and no more than about 180°), inclusive of all values and ranges therebetween. In some embodiments, the fuel can be injected during HCCI at an engine crank angle of about 0°, about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, about 310°, or about 320°.

In some embodiments, fuel injection during HCCI can begin at a first engine crank angle and fuel injection during HCCI can end at a second engine crank angle. In other words, the fuel injection event during HCCI can last long enough, such that the engine crank angle changes significantly during the fuel injection event. In some embodiments, the fuel injection event during HCCI can begin at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, or at least about 300°. In some embodiments, the fuel injection event during HCCI can begin at an engine crank angle of no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, no more than about 20°, or no more than about 10°. Combinations of the above-referenced crank angles for the beginning of the fuel injection event during HCCI are also possible (e.g., at least about 0° and no more than about 310° or at least about 100° and no more than about 180°), inclusive of all values and ranges therebetween. In some embodiments, the fuel injection event during HCCI can begin at an engine crank angle of about 0°, about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, or about 310°.

In some embodiments, the fuel injection event during HCCI can end at an engine crank angle of at least about 0° (i.e., after the beginning of the intake stroke), at least about 10°, at least about 20°, at least about 30°, at least about 40°, at least about 50°, at least about 60°, at least about 70°, at least about 80°, at least about 90°, at least about 100°, at least about 110°, at least about 120°, at least about 130°, at least about 140°, at least about 150°, at least about 160°, at least about 170°, at least about 1800 (i.e., after the beginning of the compression stroke), at least about 190°, at least about 200°, at least about 210°, at least about 220°, at least about 230°, at least about 240°, at least about 250°, at least about 260°, at least about 270°, at least about 280°, at least about 290°, at least about 300°, or at least about 310°. In some embodiments, the fuel injection event during HCCI can end at an engine crank angle of no more than about 320°, no more than about 310°, no more than about 300°, no more than about 290°, no more than about 280°, no more than about 270°, no more than about 260°, no more than about 250°, no more than about 240°, no more than about 230°, no more than about 220°, no more than about 210°, no more than about 200°, no more than about 190°, no more than about 1800 (i.e., before the beginning of the compression stroke), no more than about 170°, no more than about 160°, no more than about 150°, no more than about 140°, no more than about 130°, no more than about 120°, no more than about 110°, no more than about 100°, no more than about 90°, no more than about 80°, no more than about 70°, no more than about 60°, no more than about 50°, no more than about 40°, no more than about 30°, or no more than about 20°. Combinations of the above-referenced crank angles for the end of the fuel injection event during HCCI are also possible (e.g., at least about 100 and no more than about 3200 or at least about 1000 and no more than about 180°), inclusive of all values and ranges therebetween. In some embodiments, the fuel injection event during HCCI can end at an engine crank angle of about 10°, about 20°, about 30°, about 40°, about 50°, about 60°, about 70°, about 80°, about 90°, about 100°, about 110°, about 120°, about 130°, about 140°, about 150°, about 160°, about 170°, about 180°, about 190°, about 200°, about 210°, about 220°, about 230°, about 240°, about 250°, about 260°, about 270°, about 280°, about 290°, about 300°, about 310°, or about 3200.

In some embodiments, a portion of the fuel injection event during HCCI can occur during the intake stroke (i.e., at an engine crank angle between 0° and 180°) and a portion of the fuel injection event during HCCI can occur during the compression stroke prior to an engine crank angle of 320° (i.e., at an engine crank angle between 180° and 320°). In some embodiments, at least about 40%, at least about 45%, at least about 50%, at least about 55%, or at least about 60% of the fuel injected during the fuel injection event can be injected during the intake stroke while operating in HCCI, inclusive of all values and ranges therebetween. In some embodiments, no more than about 60%, no more than about 55%, no more than about 50%, no more than about 45%, or no more than about 40% of the fuel injected during the fuel injection event can be injected during the compression stroke while operating in HCCI, inclusive of all values and ranges therebetween.

In some embodiments, fuel injection timing can change from HCCI to steady state MCCI operation. In some embodiments, the fuel injection event during steady state MCCI can occur completely or substantially during the compression stroke. In some embodiments, at least about 60%, at least about 65%, at least about 70%, at least about 75%, at least about 80%, or at least about 85% of the fuel injected during the fuel injection event can be injected after the engine crank angle has reached 310 degrees. In some embodiments during steady state MCCI, the fuel injection event can end during the combustion stroke (i.e., at an engine crank angle of more than 360°).

In some embodiments, the fuel can be a first fuel and a second fuel can be injected during cold-start. In some embodiments, the second fuel can be a different fuel from the first fuel. In some embodiments, the second fuel can be injected during HCCI operation. In some embodiments, the second fuel can be injected during steady state MCCI operation. In some embodiments, the second fuel can have a cetane number of at least about 30, at least about 35, at least about 40, at least about 45, at least about 50, or at least about 55. In some embodiments, the second fuel can have a cetane number of no more than about 60, no more than about 55, no more than about 50, no more than about 45, no more than about 40, or no more than about 35. Combinations of the above-referenced values for the cetane number of the second fuel are also possible (e.g., at least about 30 and no more than about 60 or at least about 40 and no more than about 50), inclusive of all values and ranges therebetween. In some embodiments, the second fuel can have a cetane number of about 30, about 35, about 40, about 45, about 50, about 55, or about 60.

In some embodiments, throttling the intake to lower the effective compression ratio within the combustion chamber 250 can be implemented to mitigate knock. While the actual compression ratio in the standard CI architecture is fixed, the effective compression ratio can be reduced by throttling the air intake of the engine. A throttle plate (not shown) can partially block airflow so that incoming air is less dense, leading to a compressed state with lower density. In addition, by reducing the amount of lift of the intake valve 230 during the intake stroke, the engine ultimately draws in less air. When less air moves into the combustion chamber 250, the pressure that is ultimately achievable when the piston moves back to TDC is reduced, thereby reducing the likelihood of autoignition during the spark assisted operation period. In addition to adjusting the lift of the intake valve 230, adjusting the timing of the intake valve 230 or exhaust valve 240 can achieve similar results. The intake valve 230 can also remain closed during a portion of the intake stroke, thereby reducing the amount of air intake. The intake valve 230 can remain open during a portion of the compression stroke to achieve a similar result.

In some embodiments, the engine 200 can include a turbocharger (not shown). In some embodiments, the engine 200 can include a supercharger (not shown). In some embodiments, the engine 200 can include turbo-compounding device. In some embodiments, air can pass through the supercharger, the turbocharger, and/or the turbo-compounding device prior to entering the combustion chamber 250.

In some embodiments, keeping the intake valve 230 open longer can be used in combination with backpressure provided from the turbocharger or other exhaust restriction device (i.e., a Miller cycle setup). In some embodiments, EGR can aid in diluting the mixture of fuel within the combustion chamber 250. The use of EGR can serve the purpose of facilitating the increase of the temperature within the combustion chamber 250 and ultimately bring the combustion chamber 250 to a desired steady state temperature. Additionally, EGR can displace the air drawn in during the intake stroke and dilute the overall concentration of the fuel air mixture, increasing the energy barrier to untimely autoignition.

As the temperature in the CI engine 200 increases further toward the desired steady state operation temperature, homogeneity in the air-fuel mixture becomes less desirable. As described above, HCCI operation is only optimal in a narrow temperature range. During HCCI operation, the fuel has more time in the combustion chamber 250 to absorb thermal energy and can potentially combust substantially before TDC. In some embodiments, this occurrence in the transition through the latter stages of the SACI regime and HCCI can be mitigated by adjusting the timing of the fuel injector 270 in order to reduce the homogeneity of the air-fuel mixture. Fuel post-injection can achieve a similar result. An extra injection of fuel can further introduce stratification (or charge cooling) in the fuel injection to create the locally rich (or cool) points of fuel to assure that combustion is occurring timely. In some embodiments, the spark plug timing can be delayed to reduce the likelihood of knock being generated by the expanding, spark-ignited flame front. In some embodiments, the spark plug timing can be delayed until after the piston 220 has left the TDC position, to reduce the likelihood of knock being generated by the expanding, spark-ignited flame front. The exhaust-dilution-based knock mitigation measures described herein can also reduce engine load at high temperatures. Furthermore, each of the knock mitigation methods described herein that involve injection timing, post-injection, and EGR can also aid in knock mitigation when the assisting device 275 is a glow plug.

When operating the CI engine 200 with a spark plug, a time delay exists between the initial startup of the CI engine 200 and the completion of the transition of the CI engine 200 to steady state MCCI operation. In some embodiments, this time delay can be less than about 30 seconds, less than about 45 seconds, less than about 60 seconds, less than about 90 seconds, or less than about 120 seconds.

In some embodiments, the assisting device 275 can be a plasma ignition device. Plasma ignition can function in a similar manner to spark ignition if a standard spark plug produces insufficient localized thermal energy to produce ignition. The obstacles encountered in a plasma ignition system are similar to those in a spark assisted compression ignition system. Plasma ignition can potentially involve adjustments to mixture stratification, ignition timing, exhaust gas retention (EGR) dilution, and IVC timing in order to both promote ignition and prevent knock as desired. When operating the CI engine 200 with the use of a plasma ignition device, a time delay exists between the initial startup of the CI engine 200 and the completion of the transition of the CI engine 200 to steady state MCCI operation. In some embodiments, this time delay can be less than about 30 seconds, less than about 45 seconds, less than about 60 seconds, less than about 90 seconds, or less than about 120 seconds. In some embodiments, a plurality of assisting devices 275 can be placed throughout the CI engine 200, or one device can inject plasma in multiple directions, to stabilize combustion in multiple regions at the same time.

Figure 3:
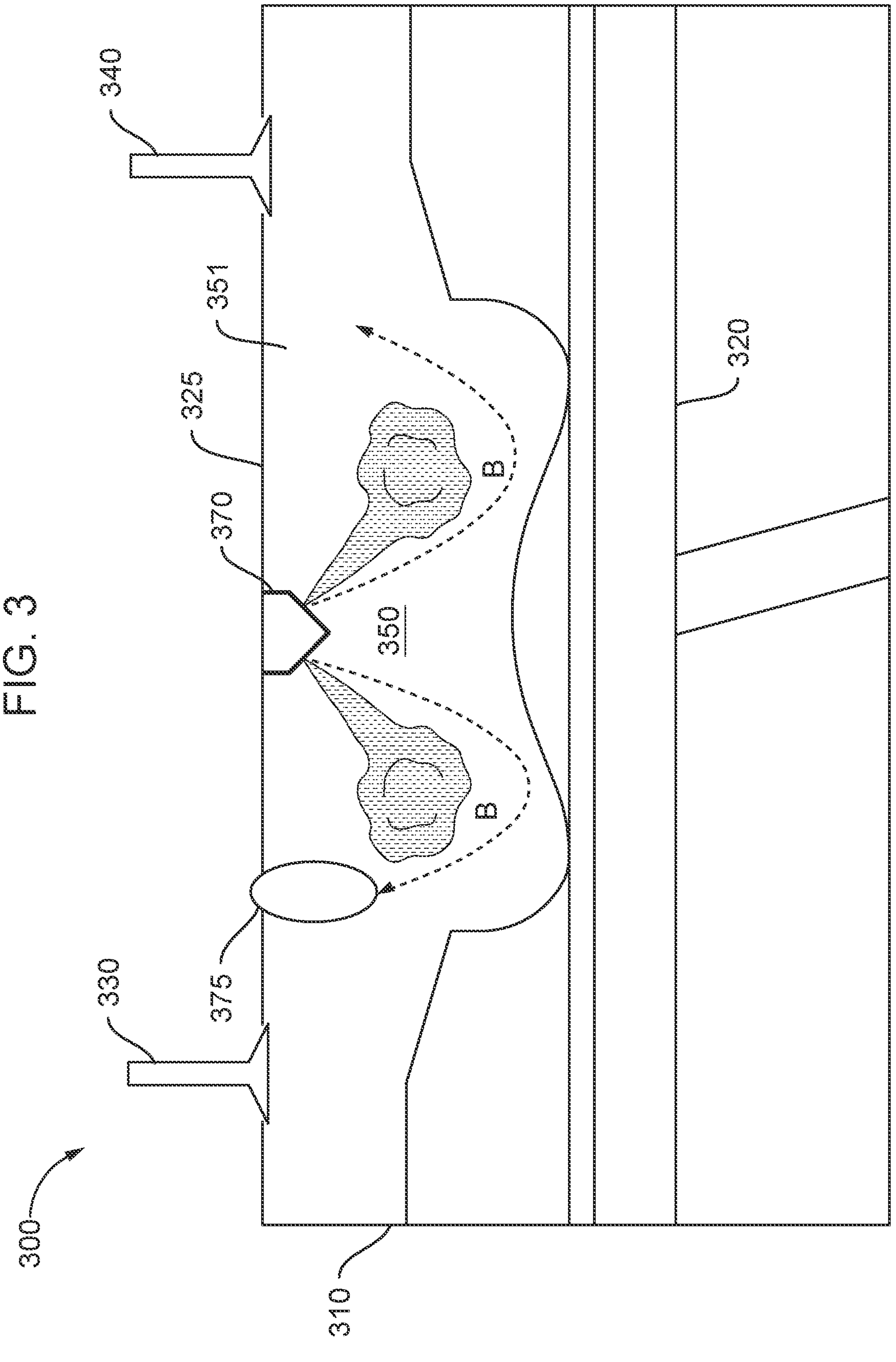
FIG. 3 is a schematic illustration of the placement of a glow plug or spark plug in a combustion chamber, according to an embodiment.

FIG. 3 shows a CI engine 300, according to an embodiment. The CI engine 300 includes a cylinder 310, a piston 320 configured to move in the cylinder 310, a head deck 325, an intake valve 330, and an exhaust valve 340. The cylinder 310, piston 320, head deck 325, intake valve 330, and exhaust valve 340 collectively define a combustion chamber 350. The CI engine 300, cylinder 310, piston 320, intake valve 330, exhaust valve 340, and combustion chamber 350 can be substantially similar or the same as the engine 100, 200, cylinder 110, 210, piston 120, 220, intake valve 130, 230, exhaust valve 140, 240, and combustion chamber 150, 250 as described above with reference to FIGS. 1 and 2. Therefore, details of certain aspects of the CI engine 300 components are not described in further detail herein, and should be considered identical or substantially similar in form or function to the corresponding components described above with respect to the engine 100, 200 unless explicitly described differently.

As shown in FIG. 3, a fuel injector 370 sprays fuel along curve B toward an assisting device 375 while the piston 320 is in the TDC position or as the piston 320 approaches the TDC position. In other words, the assisting device 375 is positioned on the outer edge of the bowl region 351 of the combustion chamber 350. In some embodiments, placement of the assisting device 375 on the outer edge of the bowl region 351 can induce surface ignition. The shape of the bowl influences the spray path of the fuel injector 370 such that the fuel can make contact with the assisting device 375 after the flow B is redirected by the piston bowl. In some embodiments, the assisting device 375 can be a glow plug, a spark plug, or a plasma ignition device. General considerations regarding operational conditions are similar for embodiments described in FIG. 3 as in FIG. 2. However, some differences may exist regarding the placement of assisting device 375. In some embodiments, placement of the assisting device 375 on the edge of the bowl region 351 can lead to a slightly delayed ignition. The longer flow path of the fuel due to the placement of assisting device 375 can lead to fuel particles being finer, more dispersed, or more thoroughly mixed with air once the particles or air/fuel vapor mixture make contact with the assisting device 375. This can lead to a more complete combustion event, as the higher surface area fuel particles contact more oxidizing air per unit surface area.

Figure 4:
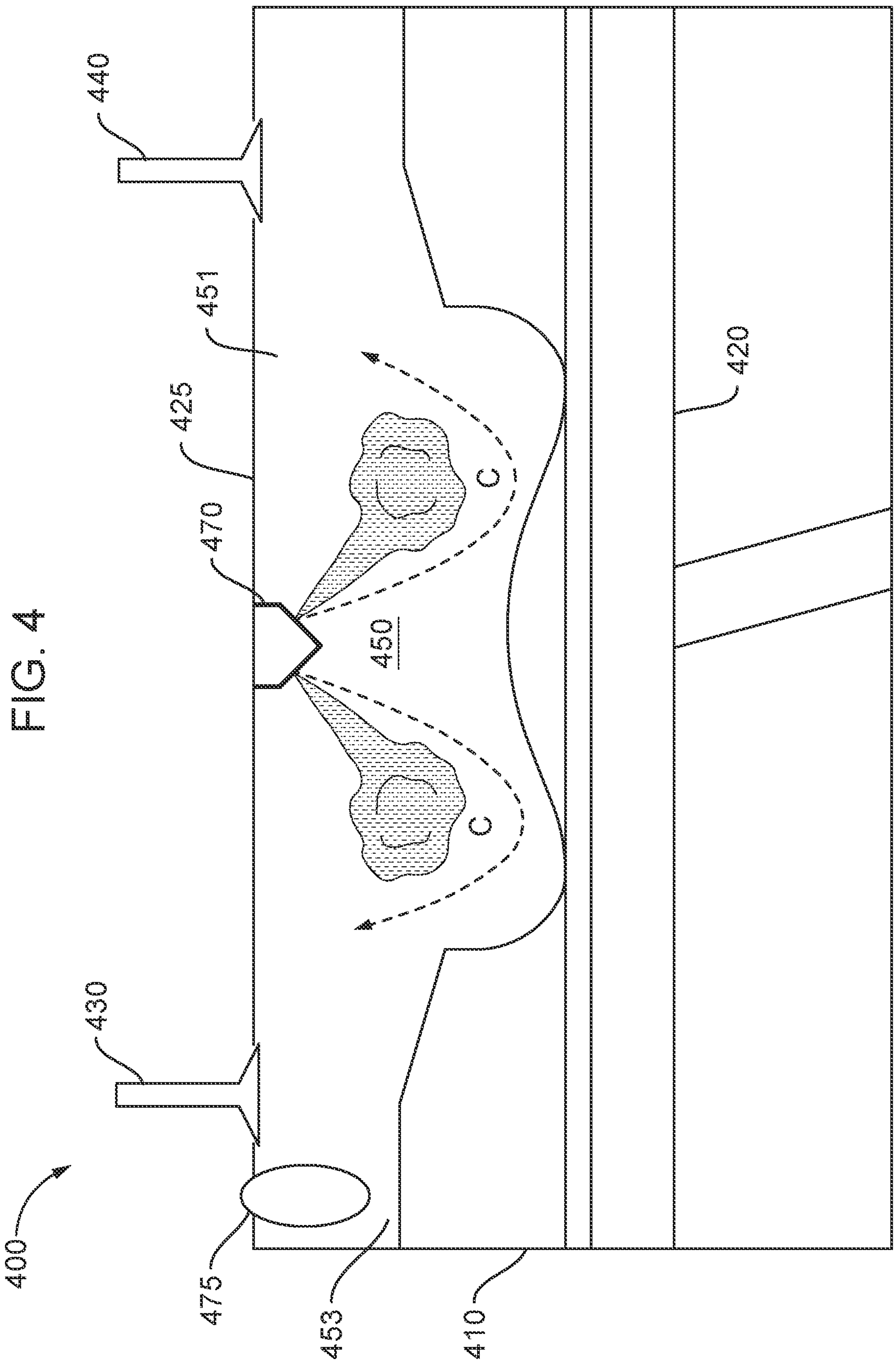
FIG. 4 is a schematic illustration of the placement of a glow plug or spark plug in a combustion chamber, according to an embodiment.

FIG. 4 shows a CI engine 400, according to an embodiment. The CI engine 400 includes a cylinder 410, a piston 420 configured to move in the cylinder 310, a cylinder head, an intake valve or valves 430, and an exhaust valve or valves 440. The cylinder 410, piston 420, head deck 425, intake valve 430, exhaust valve 440, and cylinder head collectively define a combustion chamber 450. The CI engine 400, cylinder 410, piston 420, head deck 425, intake valve 430, exhaust valve 440, and combustion chamber 450 can be substantially similar or the same as the engine 100, 200, 300, cylinder 110, 210, 310, piston 120, 220, 320, head deck 125, 225, 325, intake valve 130, 230, 330, exhaust valve 140, 240, 340, and combustion chamber 150, 250, 350 as described above with reference to FIGS. 1-3. Therefore, details of certain aspects of the CI engine 400 components are not described in further detail herein, and should be considered identical or substantially similar in form or function to the corresponding components described above with respect to the engine 100, 200, 300 unless explicitly described differently.

As shown in FIG. 4, a fuel injector 470 sprays fuel along curve C while the piston 420 is in the TDC position or as the piston 420 approaches the TDC position. In some embodiments, the assisting device 475 is positioned outside the bowl region 451 of the combustion chamber 450 in the squish region 453. The shape of the bowl influences the spray path of the fuel injector 370. In some embodiments, the assisting device 475 can be a glow plug, a spark plug, or a plasma ignition device. General considerations regarding operational conditions are similar for embodiments described in FIG. 4 as in FIG. 2. However, some differences may exist regarding the placement of assisting device 475. In some embodiments, placement of the assisting device 475 in the squish region 453 can reduce the probability of surface ignition. In some embodiments, placement of the assisting device 475 in the squish region 453 can produce a heating effect in the combustion chamber 450. The overall heat effects and ignition influence of placing the assisting device 475 in the squish region 453 can be less pronounced as compared to placement in the bowl region 451. In some embodiments, placement of the assisting device 475 in the squish region 453 of the combustion chamber 450 can lead to slightly delayed ignition. The longer flow path of the fuel due to the placement of assisting device 475 can lead to fuel particles being finer and more dispersed once the assisting device 475 has aided in initiating combustion. This can lead to a more complete combustion event, as the higher surface area fuel particles contact more oxidizing air per unit surface area.

Figure 5:
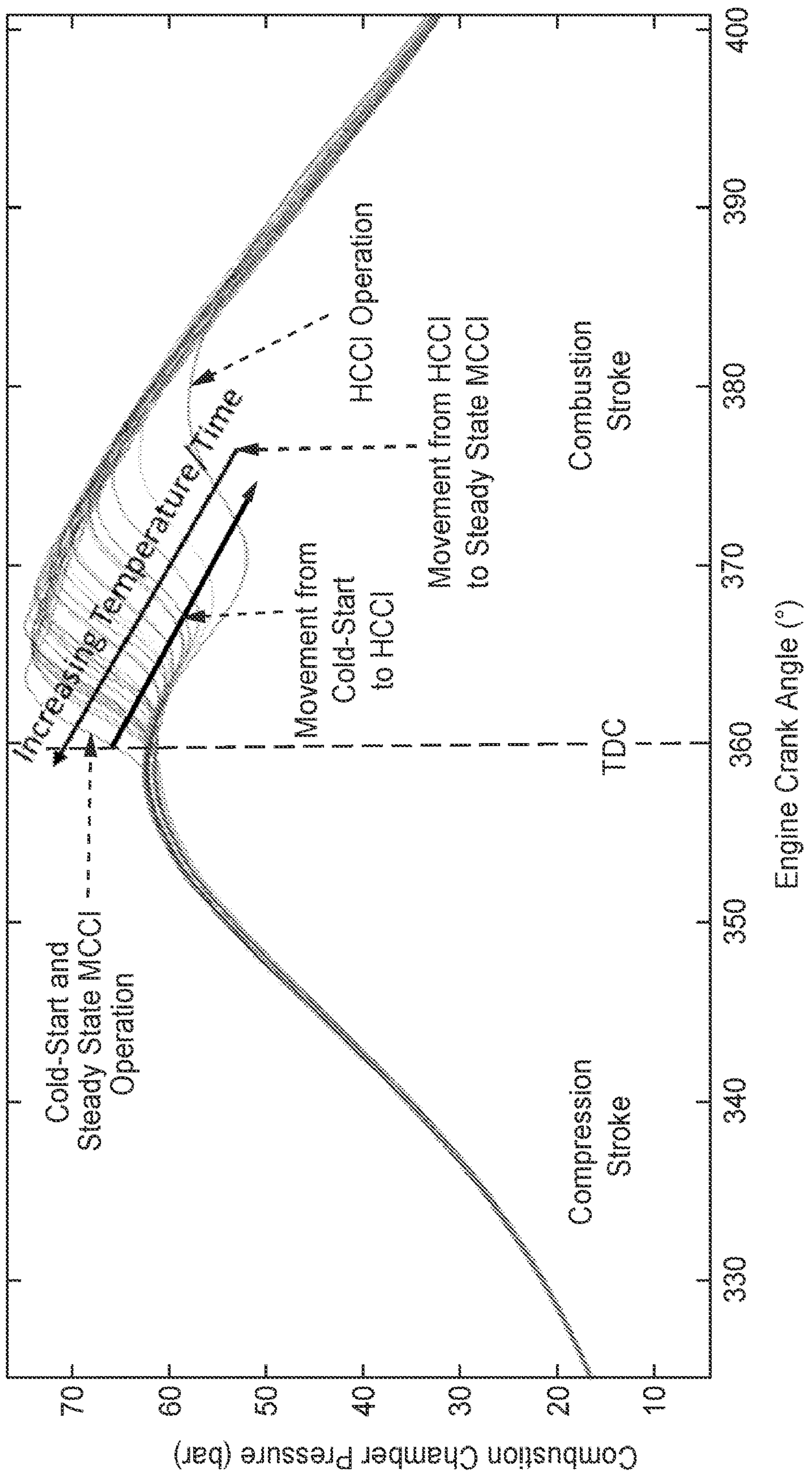
FIG. 5 is a chart illustrating the transition from SACI to HCCI and from HCCI to MCCI, according to an embodiment.

FIG. 5 shows how ignition timing can evolve with increasing engine temperature from cold-start assisted combustion, to HCCI operation, and finally to a steady state (i.e., unassisted) MCCI operation, according to some embodiments. The transitions presented herein can apply to any of the aforementioned cold-start strategies. The level of fuel stratification can influence the ignition timing. In the event of SACI or spark-assisted MCCI, the spark timing can influence ignition timing as well. As shown in FIG. 5, the curves represent engine pressure as a function of engine crank angle (i.e., time or the movement from compression stroke to combustion stroke). In this first exemplary mode, the curves with points of inflection at lower x-axis values represent cold-start and steady state MCCI operation. The curves with points of inflection at higher x-axis values represent HCCI operation, while points of inflection along these curves represent the points where an ignition event occurs and the pressure begins to increase. The ignition event can be an autoignition or a spark-assisted ignition event. As temperature in the engine initially increases, the engine operation operates in a combustion-assisted cold-start strategy. In some embodiments, this strategy can use a spark plug to control the ignition event. As the engine temperature increases, spark timing will have to be delayed to avoid the onset of knock, shifting the ignition event to later times (to the right in FIG. 5). Eventually, temperatures will increase enough to enable a compression ignition event with long ignition delay, at which point the engine will operate in an HCCI mode without additional combustion assistance. Further temperature increases shorten the required ignition delay (shifting combustion back to the left in FIG. 5), to the point of eventually reaching MCCI operation. There is no specific temperature or event within the combustion chamber that marks the transition from cold-start to HCCI or HCCI to steady state MCCI. Instead, the combustion evolves along a continuous spectrum, as shown by FIG. 5. If the engine has to sustain prolonged periods of low-load or idle, the engine can transition back to an assisted combustion mode and the ignition timing can adjust appropriately. However, in such a case, the elevated engine temperatures achieved by prolonged operation will enable a faster transition back to MCCI operation as load demand increases.

In some embodiments, the operation mode can vary based on the mass average temperature of the contents inside the combustion chamber (e.g., air or air and fuel) at the time of IVC (for simplicity, this temperature is referred to herein as IVC temperature). In some embodiments, the operation mode can vary based on the mass average temperature of the air as it passes through the intake valve (for simplicity, this temperature is referred to herein as intake air temperature). In some embodiments, the engine can operate in cold-start mode when the IVC temperature and/or the intake air temperature is less than about 200° C., less than about 190° C., less than about 180° C., less than about 180° C., less than about 170° C., less than about 160° C., less than about 150° C., less than about 140° C., less than about 130° C., less than about 120° C., less than about 110° C., less than about 100° C., less than about 90° C., less than about 80° C., less than about 70° C., less than about 60° C., less than about 50° C., less than about 40° C., less than about 30° C., or less than about 20° C., inclusive of all values and ranges therebetween.

In some embodiments, the engine can transition to HCCI when the IVC temperature and/or the intake air temperature reaches at least about 50° C., at least about 100° C., at least about 150° C., at least about 200° C., at least about 250° C., at least about 300° C., at least about 350° C., at least about 400° C., or at least about 450° C. In some embodiments, the engine can operate in HCCI when the IVC temperature and/or the intake air temperature reaches a value of no more than about 500° C., no more than about 450° C., no more than about 400° C., no more than about 350° C., no more than about 300° C., no more than about 250° C., no more than about 200° C., no more than about 150° C., or no more than about 100° C. Combinations of the above-referenced IVC temperatures and/or intake air temperatures for the transition to HCCI are also possible (e.g., at least about 50° C. and no more than about 500° C. or at least about 100° C. and no more than about 400° C.), inclusive of all values and ranges therebetween. In some embodiments, the engine can transition to HCCI when the IVC temperature and/or the intake air temperature reaches about 50° C., about 100° C., about 150° C., about 200° C., about 250° C., about 300° C., about 350° C., about 400° C., about 450° C., or about 500° C.

In some embodiments, the engine can transition to steady state MCCI operation at an IVC temperature and/or the intake air temperature of at least about 500° C., at least about 520° C., at least about 540° C., at least about 560° C., at least about 580° C., at least about 600° C., at least about 620° C., at least about 640° C., at least about 660° C., at least about 680° C., at least about 700° C., at least about 780° C., at least about 800° C., at least about 820° C., at least about 840° C., at least about 860° C., at least about 880° C., at least about 900° C., at least about 920° C., at least about 940° C., at least about 960° C., or at least about 980° C. In some embodiments, the engine can transition to steady state MCCI operation at an IVC temperature and/or the intake air temperature of no more than about 1,000° C., no more than about 980° C., no more than about 960° C., no more than about 940° C., no more than about 920° C., no more than about 900° C., no more than about 880° C., no more than about 860° C., no more than about 840° C., no more than about 820° C., no more than about 800° C., no more than about 780° C., no more than about 760° C., no more than about 740° C., no more than about 720° C., no more than about 700° C., no more than about 680° C., no more than about 660° C., no more than about 640° C., no more than about 620° C., no more than about 600° C., no more than about 580° C., no more than about 540° C., or no more than about 520° C.

Combinations of the above-referenced IVC temperatures and/or intake air temperatures for the transition to steady state MCCI are also possible (e.g., at least about 500° C. and no more than about 1,000° C. or at least about 600° C. and no more than about 800° C.), inclusive of all values and ranges therebetween. In some embodiments, the engine can transition to steady state MCCI operation at an IVC temperature and/or the intake air temperature of about 500° C., about 520° C., about 540° C., about 560° C., about 580° C., about 600° C., about 620° C., about 640° C., about 660° C., about 680° C., about 700° C., about 720° C., about 740° C., about 760° C., about 780° C., about 800° C., about 820° C., about 840° C., about 860° C., about 880° C., about 900° C., about 920° C., about 940° C., about 960° C., about 980° C., or about 1,000° C., In some embodiments, the engine can transition from cold-start to HCCI and then from HCCI to steady state MCCI. In some embodiments, the engine can transition from cold-start directly to steady state MCCI.

Figure 6:
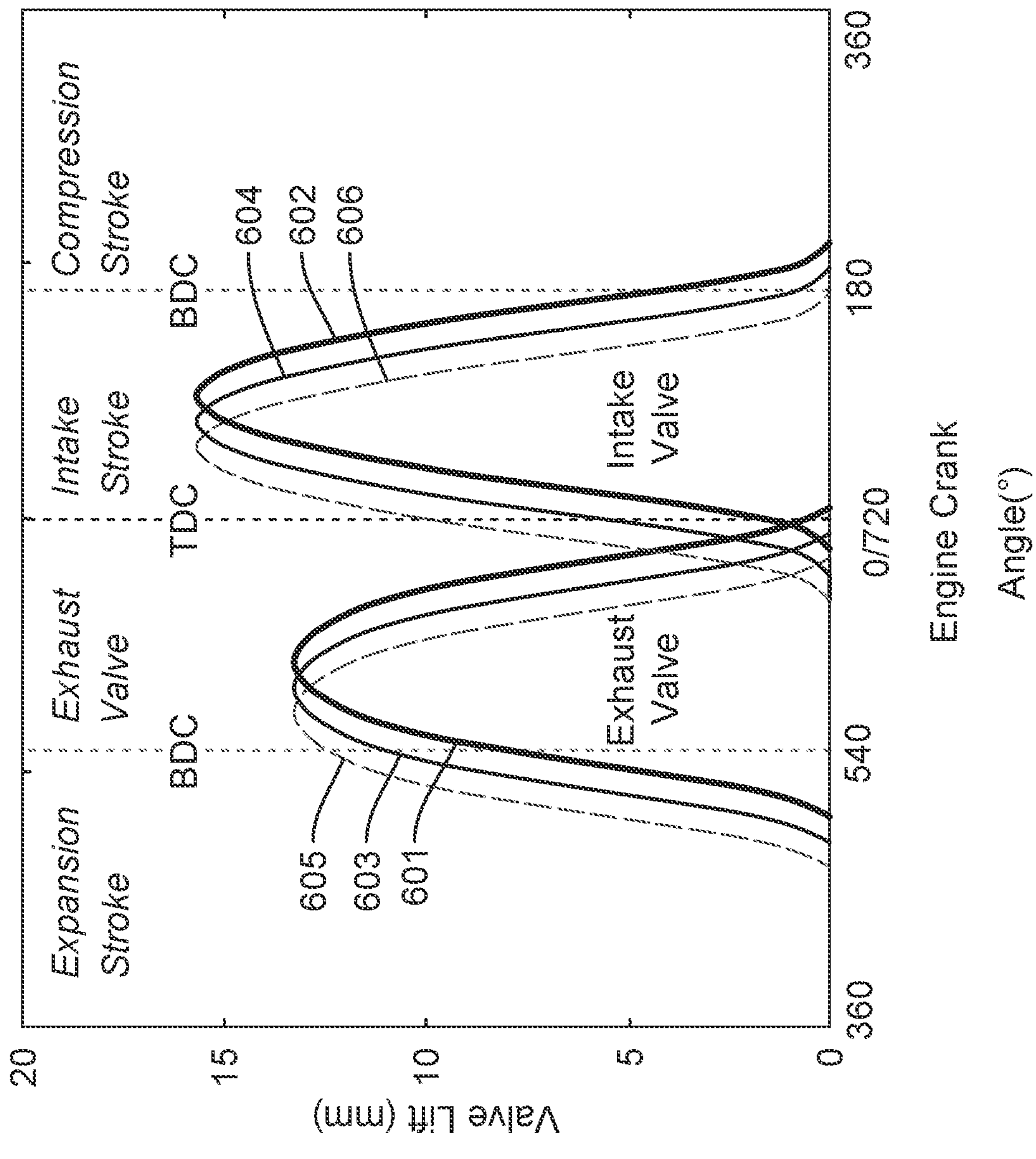
FIG. 6 is a chart illustrating the influence of valve timing on the transition from SACI to HCCI, and from HCCI to MCCI, according to an embodiment.

FIG. 6 presents a VVT scheme that can be associated with the transition of engine operation from cold-start operation, to HCCI operation, and finally to steady state MCCI operation, according to some embodiments. In each of the aforementioned cold-start strategies, there are various methods of switching from cold-start operation to steady state operation as quick and efficient as possible while mitigating knock. When moving from a cold-start combustion mode to steady state MCCI combustion, VVT can facilitate the transition. FIG. 6 is an example of a cam-phasing approach to implement VVT, in which only the cam timing of the valve opening and closing is varied. In some embodiments, the valve opening duration and valve lift (i.e., the valve profile) remain constant. In some embodiments, the cam timing can be adjusted relative to the engine position, effectively shifting both the intake and exhaust valve profiles by an equal amount of time in the same direction. In some embodiments, the base exhaust timing profile 601 can be the valve profile of the exhaust valve during initial cold-start operation and during steady state MCCI operation, while the base intake timing profile 602 can be the valve profile of the intake valve during initial cold-start operation and during steady state MCCI operation. In some embodiments, the timing of the exhaust valve can be adjusted from the base exhaust timing profile 601 to the intermediate exhaust timing profile 603 to the advanced exhaust timing profile 605 during the transition from cold-start to HCCI or spark-assisted operation. In some embodiments, the timing of the exhaust valve can be adjusted from the advanced exhaust timing profile 605, to the intermediate exhaust timing profile 603, and to the base exhaust timing profile 601 during the transition from spark-assisted or HCCI operation to steady state MCCI operation. In some embodiments, the timing of the intake valve can be adjusted from the base intake timing profile 602, to the intermediate intake timing profile 604, and to the advanced intake timing profile 606 during the transition from cold-start to spark-assisted or HCCI operation. In some embodiments, the timing of the intake valve can be adjusted from the advanced intake timing profile 606, to the intermediate intake timing profile 604, and to the base intake timing profile 602 during the transition from spark-assisted to HCCI operation to steady state MCCI operation.

Several benefits in the transition from cold-start to HCCI can be achieved when the timing of the valves changes to the advanced state. First, the effective compression ratio changes as the intake valve closes earlier during the intake stroke. This limits the amount of air drawn into the cylinder, thereby reducing the amount of piston stroke available for compression. This can reduce the amount of energy available to facilitate untimely autoignition events, or increase the energy available to shorten ignition delay as the combustion transitions back to an MCCI mode. This same effect is possible by retarding the valve timing (i.e., by closing the intake valve late), in which case compression is limited because it cannot begin before the valve is closed.

In glow plug assisted, SACI, spark-assisted MCCI, and plasma ignition cold-start modes, there are advantages associated with having a high initial effective compression ratio (approximately 17:1, the baseline ratio) via the valve timing profiles. As the engine warms to temperatures above ambient temperature but still below the desired temperature for steady state operation, the aforementioned cold-start methods are still practical. However, at compression ratios near 17:1, the possibility of knock becomes more significant with glow plug or spark assistance (if there is substantial fuel-air mixing and homogeneity). In order to mitigate this possibility, the valve timing can advance in order to reduce the effective compression ratio to a value of approximately 12:1 (based on the octane rating of the fuel in question, with higher octane fuels utilizing higher compression ratios), corresponding to the advanced exhaust timing profile 605 and the advanced intake timing profile 606. As the engine continues to warm, the combustion can transition towards the steady state MCCI combustion mode by retarding the valve timings towards their base values. However, before reaching steady state MCCI combustion, the engine can first utilize an HCCI combustion strategy with a compression ratio of about 13:1 to about 15:1, as the valve timing is transitioning back toward the base values. Using HCCI during this window of time is advantageous to mitigate knock and to take advantage of the small temperature window, in which the efficient operation of HCCI is most practical. Finally, once the engine reaches sufficient temperatures for steady state MCCI operation, the valve profiles can reach their base timing schemes to achieve the approximately 17:1 compression ratio important for steady state MCCI operation. At this point, the cold-start assistance method can discontinue.

In some embodiments, when a plasma ignition or SACI apparatus or method is employed during cold start, IVC can be advanced (i.e., early). In some embodiments, when a plasma ignition or SACI apparatus or method is employed during cold start, IVC can be delayed (i.e., late). In some embodiments, when a glow plug is used during cold-start to induce surface ignition, base valve timing can be used (e.g., base intake timing profile 602 and base exhaust timing profile 601). In some embodiments, when a glow plug is used during cold-start to induce surface ignition, exhaust valve close can be advanced. In some embodiments, when a glow plug is used during cold-start to produce a heating effect, base valve timing can be used (e.g., base intake timing profile 602 and base exhaust timing profile 601). In some embodiments, when a glow plug is used during cold-start to produce a heating effect, exhaust valve close can be advanced. In some embodiments, when an internal or external cartridge heater is used during cold-start to produce a heating effect, base valve timing can be used (e.g., base intake timing profile 602 and base exhaust timing profile 601). In some embodiments, when an internal or external cartridge heater is used during cold-start to produce a heating effect, exhaust valve close can be advanced.

A VVT strategy can also be used to stabilize combustion during periods of sustained low engine loads (i.e., low air intake and combustion), wherein the thermal energy may be insufficient for sustained MCCI operation. In some embodiments, a more complex, or asymmetrical VVT scheme can aid in achieving the desired performance characteristics of a particular engine. These VVT strategies can work in concert with a spark plug, glow plug, plasma ignition, intake-heater, pilot injection, or to any combination of the aforementioned strategies.

Additionally, the employment of a VVT strategy can potentially modulate the energy remaining in the exhaust, and the amount of exhaust available for retention and reinduction into the intake valve. As exhaust valve opening timing is advanced, the expulsion of exhaust gas through the exhaust valve occurs earlier in the expansion stroke, and thus at a higher temperature (since the combustion gases have undergone less expansion during the expansion stroke). This higher temperature exhaust will remain available in the exhaust port for reinduction into the combustion chamber. Applying both an advance in the exhaust valve opening and retarding the exhaust valve closing (i.e. longer opening duration, asymmetrical VVT) can aid reinduction such that an overlap exists between the exhaust valve opening and intake valve opening. Conversely, if instead of retarding exhaust valve closing to allow for reinduction, exhaust valve closing is advanced, exhaust can be trapped in the cylinder, or transferred to the intake port if intake valve opening is also advanced. The latter enables intake backflow (trapped exhaust flowing back into the intake port), in which case this exhaust energy will remain in the intake until the main induction event. Said another way, modified valve timing can be used to harness the added thermal energy provided by hot exhaust gases to assist in ignition of a subsequent engine cycle. This thermal energy can be important for the HCCI combustion mode, as well as MCCI combustion operation at moderate loads where exhaust thermal energy is needed to sustain the high temperatures that facilitate steady state operation. In some embodiments, during HCCI, asymmetrical VVT can be employed to close the exhaust valve early and open the intake valve late.

An additional exemplary operation mode can be used for combustion phasing and valve timing. In some embodiments, the cold-start strategy can begin with very late combustion phasing due to low energy in the combustion chamber. This late combustion phasing can reduce reaction rates of combustion. In addition, in the case of SI combustion, late combustion phasing can reduce the time for flame propagation across a large bore engine (to avoid knock). This can be accomplished with a very early injection of fuel (direct or in the port) to create a pre-mixed ignitable mixture of air and fuel that can be ignited using a spark plug.

As the engine warms, a transition to an autoignited combustion mode such as HCCI can lead to earlier combustion phasing, leading to earlier and more rapid pressure rise near TDC. The homogeneous or semi-homogeneous nature of the air-fuel mixture allows for faster simultaneous combustion throughout the cylinder. Faster combustion leads to a higher rate of pressure increase over a shorter time duration (as opposed to more spread out in time, often leading to later phasing, as it can be during cold-start). This higher rate of pressure increase can be accomplished via early injection timing to make an ignitable mixture of air and fuel. Pressure rise rate can be moderated by gradually shifting injection timing of the direct injector later in the compression stroke. This shift in injection timing can create stratification and a less homogeneous mixture, leading to a combustion process more spread out in time, since very high rates of pressure rise (greater than 15 bar per crank angle degree) can lead to unwanted engine noise.

As the engine continues to warm, the autoignited combustion can become too rapid or too early throughout the cylinder, leading to poor combustion phasing (too early), or unacceptably high rates of pressure increase. High rates of pressure increase can cause NVH from the engine, and can cause engine damage. Once the engine has warmed sufficiently, these potential problems can be mitigated by shifting injection timing even later in the compression stroke. This shift can reduce the amount of pre-mixing prior to autoignition, and can allow combustion to proceed as the fuel is injected into the cylinder. Eventually the pre-mixed fraction can be low enough and injection timing can be late enough such that the combustion is mixing-controlled, having reached injection timing and engine temperatures that can sustain steady state MCCI. In some embodiments, during steady state MCCI, base valve timing profiles can be used. In some embodiments, early exhaust valve close can be used during MCCI during lower-load points.

In some embodiments, the level of pre-mixing between fuel and air immediately prior to ignition can vary depending on whether the engine is operating in cold-start mode, HCCI, or steady state MCCI. In some embodiments, the level of pre-mixing between fuel and air immediately prior to ignition can vary during cold-start, depending on what type of ignition-assist device or method is used.

In some embodiments, at least about 10%, at least about 15%, at least about 20%, at least about 25%, at least about 30%, at least about 35%, at least about 40%, at least about 45%, at least about 50%, at least about 50%, at least about 55%, or at least about 60% of the fuel can be pre-mixed with the air immediately prior to ignition, inclusive of all values and ranges therebetween.

In some embodiments, if a plasma ignition, or a spark assisted compression ignition device or method is used during cold-start, at least about 60%, at least about 65%, at least about 70%, at least about 75%, at least about 80%, or at least about 85% of the fuel can be pre-mixed with the air immediately prior to ignition, inclusive of all values and ranges therebetween. In some embodiments, if a glow plug is used during cold-start and positioned in such a location to induce surface ignition, at least about 40%, at least about 45%, at least about 50%, at least about 55%, or at least about 60% of the fuel can be pre-mixed with the air immediately prior to ignition, inclusive of all values and ranges therebetween. In some embodiments, if a glow plug or an in cylinder cartridge heater is used to produce a heating effect during cold-start, a least about 10%, at least about 15%, at least about 20%, at least about 25%, or at least about 30% of the fuel can be pre-mixed with the air immediately prior to ignition, inclusive of all values and ranges therebetween.

In some embodiments, during HCCI, at least about 40%, at least about 45%, at least about 50%, at least about 55%, or at least about 60% of the fuel can be pre-mixed with the air immediately prior to ignition, inclusive of all values and ranges therebetween. In some embodiments, during steady state MCCI, no more than about 60%, no more than about 55%, no more than about 50%, no more than about 45%, or no more than about 40% of the fuel can be pre-mixed with the air immediately prior to ignition.

Regarding valve timing, this additional exemplary mode can also be understood using FIG. 6. In this case, the combustion would begin toward the right of the chart (with late combustion phasing), with a rapid shift towards the left of the figure as autoignition begins. After autoignition has begun, the phasing can remain near the left of the chart (the most desirable phasing for efficiency), and maintained by changing injection timing and stratification to modulate ignition delay. This injection modification can offset increasingly rapid combustion kinetics with less pre-mixing.

Throughout the cold-start, transition, and into fully developed MCCI mode, the quantity of exhaust retrained or recirculated, the engine back-pressure, or levels of engine throttling can be adjusted to stabilize combustion to meet acceptable levels of stability and pressure rise rate while accomplishing catalyst light-off in an acceptably short time frame after startup, as described previously.

In some embodiments, the intake valve can be opened during cold-start at an engine crank angle of at least about 660°, at least about 665°, at least about 670°, at least about 675°, at least about 680°, at least about 685°, at least about 690°, at least about 695°, or at least about 700°. In some embodiments, the intake valve can be opened during cold-start at an engine crank angle of no more than about 705°, no more than about 700°, no more than about 695°, no more than about 690°, no more than about 685°, no more than about 680°, no more than about 675°, no more than about 670°, or no more than about 665°. Combinations of the above-referenced engine crank angles for the opening of the intake valve during cold-start are also possible (e.g., at least about 6600 and no more than about 7050 or at least about 665° and no more than about 700°), inclusive of all values and ranges therebetween. In some embodiments, the intake valve can be opened during cold-start at an engine crank angle of about 660°, of about 665°, of about 670°, about 675°, about 680°, about 685°, about 690°, about 695°, about 700°, or about 705°.

In some embodiments, the intake valve can be opened during HCCI operation at an engine crank angle of at least about 680°, at least about 685°, at least about 690°, at least about 695°, at least about 700°, at least about 705°, at least about 710°, at least about 715°, at least about 7200 (0°, i.e., after the beginning of the intake stroke), at least about 5°, at least about 10°, at least about 15°, at least about 20°, at least about 25°, at least about 30°, at least about 35°, at least about 40°, at least about 45°, at least about 50°, or at least about 55°. In some embodiments, the intake valve can be opened during HCCI operation at an engine crank angle of no more than about 60°, no more than about 55°, no more than about 50°, no more than about 45°, no more than about 40°, no more than about 35°, no more than about 30°, no more than about 25°, no more than about 20°, no more than about 15°, no more than about 10°, no more than about 5°, no more than about 720°, no more than about 715°, no more than about 710°, no more than about 705°, no more than about 700°, no more than about 695°, no more than about 690°, no more than about 685°, no more than about 680°, or no more than about 675°. Combinations of the above-referenced engine crank angles for the opening of the intake valve during HCCI operation are also possible (e.g., at least about 6800 and/or no more than about 600 or at least about 685° and no more than about 700°), inclusive of all values and ranges therebetween. In some embodiments, the intake valve can be opened during HCCI operation at an engine crank angle of about 680°, about 685°, about 690°, about 695°, about 700°, about 705°, about 710°, about 715°, about 720°, about 5°, about 10°, about 15°, about 20°, about 30°, about 40°, about 45°, about 50°, about 55°, or about 60°.

In some embodiments, the intake valve can be closed during cold-start at an engine crank angle of at least about 160°, at least about 165°, at least about 170°, at least about 175°, at least about 180°, at least about 185°, at least about 190°, at least about 195°, at least about 200°, at least about 205°, at least about 210°, at least about 215°, at least about 220°, at least about 225°, at least about 230°, at least about 235°, at least about 240°, at least about 245°, at least about 250°, or at least about 255°. In some embodiments, the intake valve can be closed during cold-start at an engine crank angle of no more than about 260°, no more than about 255°, no more than about 250°, no more than about 245°, no more than about 240°, no more than about 235°, no more than about 230°, no more than about 225°, no more than about 220°, no more than about 215°, no more than about 210°, no more than about 205°, no more than about 200°, no more than about 1950 no more than about 190°, no more than about 185°, no more than about 180°, no more than about 175°, no more than about 170°, or no more than about 165°. Combinations of the above-referenced engine crank angles for the closing of the intake valve during cold-start are also possible (e.g., at least about 1600 and no more than about 2600 or at least about 1800 and no more than about 200°), inclusive of all values and ranges therebetween. In some embodiments, intake valve can be closed during cold-start at an engine crank angle of about 160°, about 165°, about 170°, about 175°, about 180°, about 185°, about 190°, about 195°, about 200°, about 205°, about 210°, about 215°, about 220°, about 225°, about 230°, about 235°, about 240°, about 245°, about 250°, about 255°, or about 2600.

In some embodiments, the intake valve can be closed during HCCI operation at an engine crank angle of at least about 140°, at least about 145°, at least about 150°, at least about 155°, at least about 160°, at least about 165°, at least about 170°, at least about 175°, at least about 180°, at least about 185°, at least about 190°, at least about 195°, at least about 200°, at least about 205°, at least about 210°, at least about 215°, at least about 220°, at least about 225°, at least about 230°, at least about 235°, at least about 240°, at least about 245°, at least about 250°, at least about 255°, at least about 260°, at least about 265°, at least about 270°, or at least about 275°. In some embodiments, the intake valve can be closed during HCCI operation at an engine crank angle of no more than about 280°, no more than about 275°, no more than about 270°, no more than about 265°, no more than about 260°, no more than about 255°, no more than about 250°, no more than about 245°, no more than about 240°, no more than about 235°, no more than about 230°, no more than about 225°, no more than about 220°, no more than about 215°, no more than about 210°, no more than about 205°, no more than about 200°, no more than about 195°, no more than about 190°, no more than about 185°, no more than about 180°, no more than about 175°, no more than about 170°, no more than about 165°, no more than about 160°, no more than about 155°, no more than about 150°, no more than about 145°. Combinations of the above-referenced engine crank angles for the closing of the intake valve during HCCI operation are also possible (e.g., at least about 140° and no more than about 280° or at least about 200° and no more than about 220°), inclusive of all values and ranges therebetween. In some embodiments, intake valve can be closed during HCCI operation at an engine crank angle of about 140°, about 145°, about 150°, about 155°, about 160°, about 165°, about 170°, about 175°, about 180°, about 185°, about 190°, about 195°, about 200°, about 205°, about 210°, about 215°, about 220°, about 225°, about 230°, about 235°, about 240°, about 245°, about 250°, about 255°, about 260°, about 265°, about 270°, about 275°, or about 280°.

In some embodiments, the exhaust valve can be opened during cold-start at an engine crank angle of at least about 460°, at least about 465°, at least about 470°, at least about 475°, at least about 480°, at least about 485°, at least about 490°, at least about 495°, at least about 500°, at least about 505°. In some embodiments, the exhaust valve can be opened during cold-start and an engine crank angle of no more than about 510°, no more than about 505°, no more than about 500°, no more than about 495°, no more than about 490°, no more than about 485°, no more than about 480°, no more than about 475°, no more than about 470°, or no more than about 465°. Combinations of the above-referenced engine crank angles for the opening of the exhaust valve during cold-start are also possible (e.g., at least about 4600 and no more than about 5100 or at least about 4700 and no more than about 490°), inclusive of all values and ranges therebetween. In some embodiments, the exhaust valve can be opened during cold-start at an engine crank angle of about 460°, about 465°, about 470°, about 475°, about 480°, about 485°, about 490°, about 495°, about 500°, about 505°, or about 510°.

In some embodiments, the exhaust valve can be opened during HCCI operation at an engine crank angle of at least about 470°, at least about 475°, at least about 480°, at least about 485°, at least about 490°, at least about 495°, at least about 500°, at least about 505°, at least about 510°, or at least about 515°. In some embodiments, the exhaust valve can be opened during HCCI operation and an engine crank angle of no more than about 520°, no more than about 515°, no more than about 510°, no more than about 505°, no more than about 500°, no more than about 495°, no more than about 490°, no more than about 485°, no more than about 480°, no more than about 475°. Combinations of the above-referenced engine crank angles for the opening of the exhaust valve during HCCI operation are also possible (e.g., at least about 4700 and no more than about 5200 or at least about 4900 and no more than about 5100), inclusive of all values and ranges therebetween. In some embodiments, the exhaust valve can be opened during HCCI operation at an engine crank angle of about 470°, about 475°, about 480°, about 485°, about 490°, about 495°, about 500°, about 505°, about 510°, about 515°, or about 520°.

In some embodiments, the exhaust valve can be closed during cold-start at an engine crank angle of at least about 700°, at least about 705°, at least about 710°, at least about 715°, at least about 0°, at least about 5°, or at least about 10°. In some embodiments, the exhaust valve can be closed during cold-start and an engine crank angle of no more than about 15°, no more than about 10°, no more than about 5°, no more than about 720°, no more than about 715°, no more than about 710°, or no more than about 705°. Combinations of the above-referenced engine crank angles for the closing of the exhaust valve during cold-start are also possible (e.g., at least about 7000 and/or no more than about 150 or at least about 7000 and no more than about 7100), inclusive of all values and ranges therebetween. In some embodiments, the exhaust valve can be closed during cold-start at an engine crank angle of about 700°, about 705°, about 710°, about 715°, about 720°, about 5°, about 10°, about 15°, about 20°, about 25°, about 30°, or about 35°.

In some embodiments, the exhaust valve can be closed during cold-start at an engine crank angle of at least about 600°, at least about 605°, at least about 610°, at least about 615°, at least about 620°, at least about 625°, at least about 630°, at least about 635°, at least about 640°, at least about 645°, at least about 650°, at least about 655°, at least about 660°, at least about 665°, at least about 670°, at least about 675°, at least about 680°, at least about 685°, at least about 690°, at least about 695°, at least about 700°, at least about 705°, at least about 710°, at least about 715°, at least about 0° (720°), at least about 5°, at least about 10°, at least about 15°, at least about 20°, at least about 25°, at least about 30°, at least about 35°, at least about 40°, at least about 45°, at least about 50°, at least about 55°, at least about 60°, at least about 65°, at least about 70°, at least about 75°, at least about 80°, at least about 85°, at least about 90°, at least about 95°, at least about 100°, at least about 105°, or at least about 110°. In some embodiments, the exhaust valve can be closed during cold-start and an engine crank angle of no more than about 115°, no more than about 110°, no more than about 105°, no more than about 100°, no more than about 95°, no more than about 90°, no more than about 85°, no more than about 80°, no more than about 75°, no more than about 70°, no more than about 65°, no more than about 60°, no more than about 55°, no more than about 50°, no more than about 45°, no more than about 40°, no more than about 35°, no more than about 30°, no more than about 25°, no more than about 20°, no more than about 15°, no more than about 10°, no more than about 5°, no more than about 720°, no more than about 715°, no more than about 710°, no more than about 705°, no more than about 700°, no more than about 695°, no more than about 690°, no more than about 685°, no more than about 680°, no more than about 675°, no more than about 670°, no more than about 665°, no more than about 660°, no more than about 655°, no more than about 650°, no more than about 645°, no more than about 640°, no more than about 635°, no more than about 630°, no more than about 625°, no more than about 620°, no more than about 615°, no more than about 610°, or no more than about 605°. Combinations of the above-referenced engine crank angles for the closing of the exhaust valve during cold-start are also possible (e.g., at least about 6000 and/or no more than about 1150 or at least about 0° and no more than about 10°), inclusive of all values and ranges therebetween. In some embodiments, the exhaust valve can be closed during cold-start at an engine crank angle of about 700°, about 705°, about 710°, about 715°, about 720°, about 725°, about 730°, about 735°, about 740°, about 745°, about 750°, about 755°, about 760°, about 765°, about 770°, about 775°, about 780°, about 785°, about 790°, about 795°, about 705°, about 710°, about 715°, about 0°, about 5°, about 10°, about 15°, about 20°, about 25°, about 30°, about 35°, about 40°, about 45°, about 50°, about 55°, about 60°, about 65°, about 70°, about 75°, about 80°, about 85°, about 90°, about 95°, about 100°, about 105°, about 110°, or about 115°.

Shifting the timing of the exhaust valve closing during operation, or the exhaust valve closing in relation to intake valve opening, can aid in trapping exhaust in the combustion chamber, or in rebreathing exhaust into the combustion chamber. In some embodiments, the exhaust valve closing time can shift shortly after the engine has started. In some embodiments, the exhaust valve closing time can shift during cold-start. In some embodiments, the exhaust valve closing time can shift during the transition from cold-start to HCCI operation. In some embodiments, the exhaust valve closing time can shift during HCCI operation. In some embodiments, the exhaust valve closing time can shift during the transition from HCCI operation to steady state MCCI operation.

Shifting the timing of the intake valve closing during operation (i.e., shifting intake valve closing time between a first engine cycle and a second engine cycle, the second engine cycle occurring later than the first engine cycle) can affect the amount of air brought into the combustion chamber and the level of compression the gases experience after the intake valve closes. In some embodiments, the intake valve closing time shift can be an advance (i.e., earlier closing). In some embodiments, the advance can be by at least about 20 crank angle degrees, at least about 25 crank angle degrees, at least about 30 crank angle degrees, at least about 35 crank angle degrees, at least about 40 crank angle degrees, at least about 45 crank angle degrees, at least about 50 crank angle degrees, or at least about 55 crank angle degrees. In some embodiments, the advance can be by no more than about 60 crank angle degrees, no more than about 55 crank angle degrees, no more than about 50 crank angle degrees, no more than about 45 crank angle degrees, no more than about 40 crank angle degrees, no more than about 35 crank angle degrees, no more than about 30 crank angle degrees, or no more than about 25 crank angle degrees. Combinations of the above-referenced intake valve closing advances are also possible (e.g., at least about 20 crank angle degrees and no more than about 60 crank angle degrees or at least about 30 crank angle degrees and no more than about 50 crank angle degrees), inclusive of all values and ranges therebetween. In some embodiments, the intake valve advance can be by about 20 crank angle degrees, about 25 crank angle degrees, about 30 crank angle degrees, about 35 crank angle degrees, about 40 crank angle degrees, about 45 crank angle degrees, about 50 crank angle degrees, about 55 crank angle degrees, or about 60 crank angle degrees.

In some embodiments, the intake valve closing time shift can be a delay (i.e., later closing). In some embodiments, the delay can be by at least about 20 crank angle degrees, at least about 25 crank angle degrees, at least about 30 crank angle degrees, at least about 35 crank angle degrees, at least about 40 crank angle degrees, at least about 45 crank angle degrees, at least about 50 crank angle degrees, or at least about 55 crank angle degrees. In some embodiments, the delay can be by no more than about 60 crank angle degrees, no more than about 55 crank angle degrees, no more than about 50 crank angle degrees, no more than about 45 crank angle degrees, no more than about 40 crank angle degrees, no more than about 35 crank angle degrees, no more than about 30 crank angle degrees, or no more than about 25 crank angle degrees. Combinations of the above-referenced intake valve closing delays are also possible (e.g., at least about 20 crank angle degrees and no more than about 60 crank angle degrees or at least about 30 crank angle degrees and no more than about 50 crank angle degrees), inclusive of all values and ranges therebetween. In some embodiments, the intake valve delay can be by about 20 crank angle degrees, about 25 crank angle degrees, about 30 crank angle degrees, about 35 crank angle degrees, about 40 crank angle degrees, about 45 crank angle degrees, about 50 crank angle degrees, about 55 crank angle degrees, or about 60 crank angle degrees.

In some embodiments, the exhaust valve closing time can shift shortly after the engine has started. In some embodiments, the exhaust valve closing time can shift during cold-start. In some embodiments, the exhaust valve closing time can shift during the transition from cold-start to HCCI operation. In some embodiments, the exhaust valve closing time can shift during HCCI operation. In some embodiments, the exhaust valve closing time can shift during the transition from HCCI operation to steady state MCCI operation.

In some embodiments, the exhaust valve closing time shift can be an advance (i.e., earlier closing). In some embodiments, the advance can be by at least about 20 crank angle degrees, at least about 25 crank angle degrees, at least about 30 crank angle degrees, at least about 35 crank angle degrees, at least about 40 crank angle degrees, at least about 45 crank angle degrees, at least about 50 crank angle degrees, or at least about 55 crank angle degrees. In some embodiments, the advance can be by no more than about 60 crank angle degrees, no more than about 55 crank angle degrees, no more than about 50 crank angle degrees, no more than about 45 crank angle degrees, no more than about 40 crank angle degrees, no more than about 35 crank angle degrees, no more than about 30 crank angle degrees, or no more than about 25 crank angle degrees. Combinations of the above-referenced exhaust valve closing advances are also possible (e.g., at least about 20 crank angle degrees and no more than about 60 crank angle degrees or at least about 30 crank angle degrees and no more than about 50 crank angle degrees), inclusive of all values and ranges therebetween. In some embodiments, the exhaust valve advance can be by about 20 crank angle degrees, about 25 crank angle degrees, about 30 crank angle degrees, about 35 crank angle degrees, about 40 crank angle degrees, about 45 crank angle degrees, about 50 crank angle degrees, about 55 crank angle degrees, or about 60 crank angle degrees.

In some embodiments, the exhaust valve closing time shift can be a delay (i.e., later closing). In some embodiments, the delay can be by at least about 20 crank angle degrees, at least about 25 crank angle degrees, at least about 30 crank angle degrees, at least about 35 crank angle degrees, at least about 40 crank angle degrees, at least about 45 crank angle degrees, at least about 50 crank angle degrees, or at least about 55 crank angle degrees. In some embodiments, the delay can be by no more than about 60 crank angle degrees, no more than about 55 crank angle degrees, no more than about 50 crank angle degrees, no more than about 45 crank angle degrees, no more than about 40 crank angle degrees, no more than about 35 crank angle degrees, no more than about 30 crank angle degrees, or no more than about 25 crank angle degrees. Combinations of the above-referenced exhaust valve closing delays are also possible (e.g., at least about 20 crank angle degrees and no more than about 60 crank angle degrees or at least about 30 crank angle degrees and no more than about 50 crank angle degrees), inclusive of all values and ranges therebetween. In some embodiments, the exhaust valve delay can be by about 20 crank angle degrees, about 25 crank angle degrees, about 30 crank angle degrees, about 35 crank angle degrees, about 40 crank angle degrees, about 45 crank angle degrees, about 50 crank angle degrees, about 55 crank angle degrees, or about 60 crank angle degrees.

In some embodiments, an engine can employ the strategies described herein in parallel. While independent use of each of these methods is possible, their combination is within the scope of this disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, a numerical definition of a "crank angle" or an "engine crank angle" should be understood as the crank angle relative to the TDC position between the exhaust stroke and the intake stroke (as depicted in FIG. 6). In other words, the engine crank angle is 0° (or 720°) when the piston is in the TDC position between the exhaust stroke and the intake stroke. The engine crank angle is 360° when the piston is in the TDC position between the compression stroke and the expansion stroke. The engine crank angle is 540° when the piston is in the BDC position between the expansion stroke and the exhaust stroke. The engine crank angle is 180° when the piston is in the BDC position between the intake stroke and the compression stroke.

In some embodiments, the term "immediately prior to ignition" can refer to a temporal point, at which the engine crank angle is about 300°, about 305°, about 310°, about 315°, about 320°, about 325°, about 330°, about 335°, about 340°, about 345°, about 350°, about 355°, about 360°, about 365°, about 370°, about 375°, or about 380°, inclusive of all values and ranges therebetween.

In some embodiments, the term "immediately prior to ignition" can refer to a temporal point preceding the time at which 5% of the fuel exothermicity is observed to have happened. In other words, the fuel can be considered to have ignited when a measurable deviation in pressure could be detected to indicate exothermic fuel oxidation is occurring.

In some embodiments, the term "valve closing" (e.g., "intake valve closing" or "exhaust valve closing") can refer to a temporal point, wherein the valve becomes fully seated (i.e., 0 mm valve lift). In some embodiments, the term "valve opening" (e.g., "intake valve opening" or "exhaust valve opening") can refer to a temporal point, wherein the valve becomes unseated (i.e., >0 mm lift).

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of operating a compression ignition engine during a cold-start time period, the compression ignition engine defining a combustion chamber, the method comprising:

drawing a volume of air into the combustion chamber during the cold-start time period, the cold-start time period designated as a time period in which the volume of air has a mass-average temperature of less than about 50° C. at the moment the volume of air enters the combustion chamber;

compressing the volume of air at a compression ratio of between about 15 and about 25;

transferring a volume of a single, alcohol-based fuel having a cetane number of less than 20 into the combustion chamber, the volume of the single, alcohol-based fuel and the volume of air forming an air-fuel mix; and igniting the air-fuel mix.

2. The method of claim 1, wherein compressing the volume of air includes moving a piston disposed in the combustion chamber from a bottom dead center position to a top dead center position.

3. The method of claim 1, wherein at least about 20% of the volume of the single, alcohol-based fuel is pre-mixed with the volume of compressed air immediately prior to ignition.

4. The method of claim 3, wherein at least about 50% of the volume of the single, alcohol-based fuel is pre-mixed with the volume of air immediately prior to ignition.

5. The method of claim 1, wherein the igniting causes all of the volume of the air-fuel mix to combust.

6. The method of claim 1, wherein the igniting is caused by an ignition-assist device, the ignition-assist device located in a bowl region of the combustion chamber.

7. The method of claim 6, wherein the ignition-assist device includes at least one of a glow plug, a spark plug, a plasma ignition device, and/or a cartridge heater.

8. The method of claim 1, wherein:

drawing the volume of air into the combustion chamber includes opening an intake valve coupled to the combustion chamber, and the method further comprises:

prior to igniting the air-fuel mix, closing the intake valve at an engine crank angle between 175 and 255 degrees, and opening the intake valve at an engine crank angle between 660 and 705 degrees during a second time period to draw air into the combustion chamber, the second time period after the cold-start time period.

9. The method of claim 8, further comprising:

closing the intake valve at an engine crank angle between about 175 and about 255 degrees during a third time period following the second time period.

10. The method of claim 1, wherein the volume of the single, alcohol-based fuel has a cetane number of less than about 10.

11. The method of claim 10, wherein the volume of the single, alcohol-based fuel has a cetane number of less than about 5.

12. The method of claim 1, wherein:

the compression ignition engine further comprises at least one of a turbocharger, a supercharger, or a turbo-compounding device, and the method further comprises:

passing the volume of air through the at least one of the turbocharger, the supercharger, or the turbo-compounding device prior to drawing the volume of air into the combustion chamber.

13. The method of claim 12 further comprising:

restricting at least a portion of a volume of exhaust from exiting the combustion chamber.

14. A method of operating a compression ignition engine during a cold-start time period, the compression ignition engine defining a combustion chamber, the method comprising:

drawing a volume of air into the combustion chamber during the cold-start time period in which the volume of air has a mass-average temperature of less than about 50° C. at the moment the volume of air enters the combustion chamber;

compressing the volume of air in the combustion chamber at a compression ratio of between about 15 and about 25;

transferring, via a single fuel injection event, a volume of a single alcohol fuel into the combustion chamber, the volume of the single alcohol fuel and the volume of air forming an air-fuel mix; and using an ignition-assist device to combust all of the volume of the single alcohol fuel.

15. The method of claim 14, wherein the ignition-assist device is located in a bowl region of the combustion chamber.

16. The method of claim 14, wherein the ignition-assist device includes at least one of a glow plug, a spark plug, a plasma ignition device, or a cartridge heater.

17. The method of claim 14, wherein at least about 20% of the volume of the single alcohol fuel is pre-mixed with the volume of air immediately prior to ignition.

18. The method of claim 14, wherein:

the compression ignition engine further includes an intake valve, and the method further includes:

prior to combusting all of the volume of the single alcohol fuel, closing the intake valve.

19. The method of claim 18, wherein:

closing the intake valve is at an engine crank angle between 175 and 255 degrees, and the method further comprises:

opening the intake valve at an engine crank angle between 660 and 705 degrees during a second time period after the cold-start time period to draw air into the combustion chamber.

20. The method of claim 19, further comprising:

closing the intake valve at an engine crank angle between about 175 and about 255 degrees during a third time period after the second time period.

21. The method of claim 14, wherein:

the compression ignition engine further comprises at least one of a turbocharger, a supercharger, or a turbo-compounding device, and the method further comprises:

passing the volume of air through the at least one of the turbocharger, the supercharger, or the turbo-compounding device prior to drawing the volume of air into the combustion chamber.

22. A method of operating a compression ignition engine during a cold-start time period, the compression ignition engine defining a combustion chamber, a piston disposed in and configured to move in the combustion chamber, the method comprising:

drawing a volume of air into the combustion chamber during the cold-start time period, the cold-start time period designated as a time period in which the volume of air has a mass-average temperature of less than about 50° C. at the moment the volume of air passes through an intake valve;

compressing, via the piston, the volume of air at a compression ratio of between about 15 and about 25;

transferring a volume of a single alcohol fuel having a cetane number of less than about 20 into the combustion chamber, the volume of the single alcohol fuel and the volume of air forming an air-fuel mix; and igniting, via an ignition-assist device, all of the volume of the single alcohol fuel.

23. The method of claim 22, wherein the ignition-assist device is located in a bowl region of the combustion chamber.

24. The method of claim 22, wherein the ignition-assist device includes at least one of a glow plug, a spark plug, a plasma ignition device, or a cartridge heater.

25. The method of claim 22, wherein at least about 20% of the volume of the single alcohol fuel is pre-mixed with the volume of air immediately prior to ignition.

26. The method of claim 22, further comprising:

opening the intake valve at an engine crank angle between 660 and 705 degrees during a second time period after the cold-start time period to draw air into the combustion chamber.

27. The method of claim 26, further comprising:

closing the intake valve at an engine crank angle between about 175 and about 255 degrees during a third time period after the second time period.

28. The method of claim 22, wherein the single alcohol fuel has a cetane number of less than about 10.

29. The method of claim 22, wherein:

the compression ignition engine further comprises at least one of a turbocharger, a supercharger, or a turbo-compounding device, and the method further comprises:

passing the volume of air through the at least one of the turbocharger, the supercharger, or the turbo-compounding device prior to drawing the volume of air into the combustion chamber.

30. The method of claim 29, further comprising:

restricting at least a portion of a volume of exhaust from exiting the combustion chamber.

* * * * *